United States Patent
Konno et al.

[11] Patent Number: 5,883,631
[45] Date of Patent: Mar. 16, 1999

[54] FREE-FORM SURFACE GENERATION FROM DETECTED GEOMETRIC CONTINUITY ON COMMON NURBS BOUNDARY CURVE

[75] Inventors: Kouichi Konno, Oomiya; Hiroaki Chiyokura, Tokyo, both of Japan

[73] Assignee: Ricoh Company, Ltd., Tokyo, Japan

[21] Appl. No.: 925,770

[22] Filed: Sep. 9, 1997

Related U.S. Application Data

[63] Continuation of Ser. No. 417,776, Apr. 6, 1995, abandoned.

[30] Foreign Application Priority Data

Apr. 8, 1994 [JP] Japan ................................. 6-070619

[51] Int. Cl.$^6$ .................................................... G06T 17/20
[52] U.S. Cl. ............................................................. 345/423
[58] Field of Search ..................................... 345/419–425

[56] References Cited

U.S. PATENT DOCUMENTS

| | | | |
|---|---|---|---|
| 5,278,948 | 1/1994 | Luken et al. | 345/423 |
| 5,345,546 | 9/1994 | Harada et al. | 345/442 |
| 5,377,320 | 12/1994 | Abi-Ezzi et al. | 345/423 X |
| 5,390,292 | 2/1995 | Takamura et al. | 345/423 X |
| 5,488,684 | 1/1996 | Gharachorloo et al. | 345/423 |
| 5,497,453 | 3/1996 | Megahed et al. | 345/427 X |
| 5,510,995 | 4/1996 | Oliver | 345/419 X |
| 5,555,356 | 9/1996 | Scheibl | 345/423 X |

OTHER PUBLICATIONS

Moreton et al., Functional Optimization for Fair Surface Design, Computer Graphics, pp. 167–176, Jul. 1992.
Welch et al., Variational Surface Modeling, Computer Graphics, pp. 157–166, Jul. 1992.
Loop, Smooth Spline Surfaces over Irregular Meshes, Computer Graphics, pp. 303–310, Jul. 1994.
Foley et al., Computer Graphics: Priniples and Practice, pp. 478–501, 1990.
Computer–Aided Design, vol. 26, No. 2, pp. 145–155, Feb. 2, 1994, Feanqiang Lin, et al., "Expressing Coons–Gordon Surfaces as NURBS".
NURBS for Curve and Surface Design, pp. 15–34, 1991, Hiroaki Chiyokura, et al., "G1 Surface Interpolation Over Irregular Meshes With Rational Curves".
Scientific Visualization of Physical Phenomena, pp. 435–456, 1991, Kouichi Konno, et al., "A New Control Method For Free–Form Surfaces With Tangent Continuity and its Applications".
IEEE Computer Graphics & Applications, vol. 12, No. 5, pp. 78–86, 1992, Gerald Farin, "From Conics to NURBS: A Tutorial and Survey".

*Primary Examiner*—Anton Fetting
*Attorney, Agent, or Firm*—Oblon, Spivak, McClelland, Maier & Neustadt, P.C.

[57] ABSTRACT

A free-form surface generating method. There is a generating of a continuity condition by detecting a continuity on a common boundary of two free-form surfaces based on tangent vectors on a NURBS common boundary curve and tangent vectors on boundary curves continuous to end points of the NURBS common boundary curve. Next, one of a plurality of predetermined joining processes is selected in accordance with the continuity condition. Then, internal control points of each of the two free-form surfaces are generated based on the selected joined with continuity on the common boundary are generated.

10 Claims, 17 Drawing Sheets

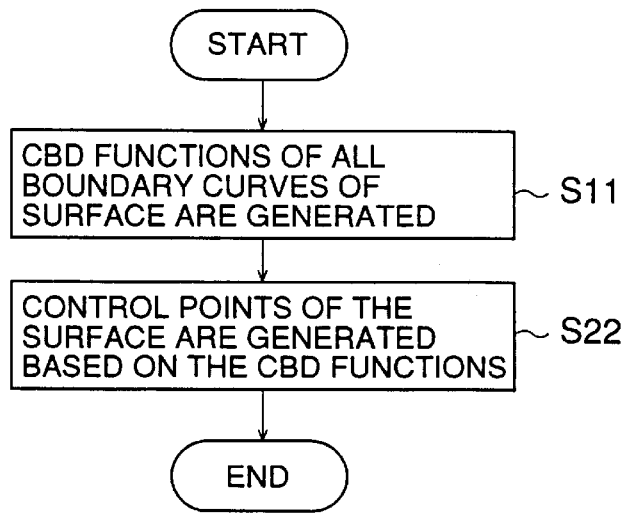
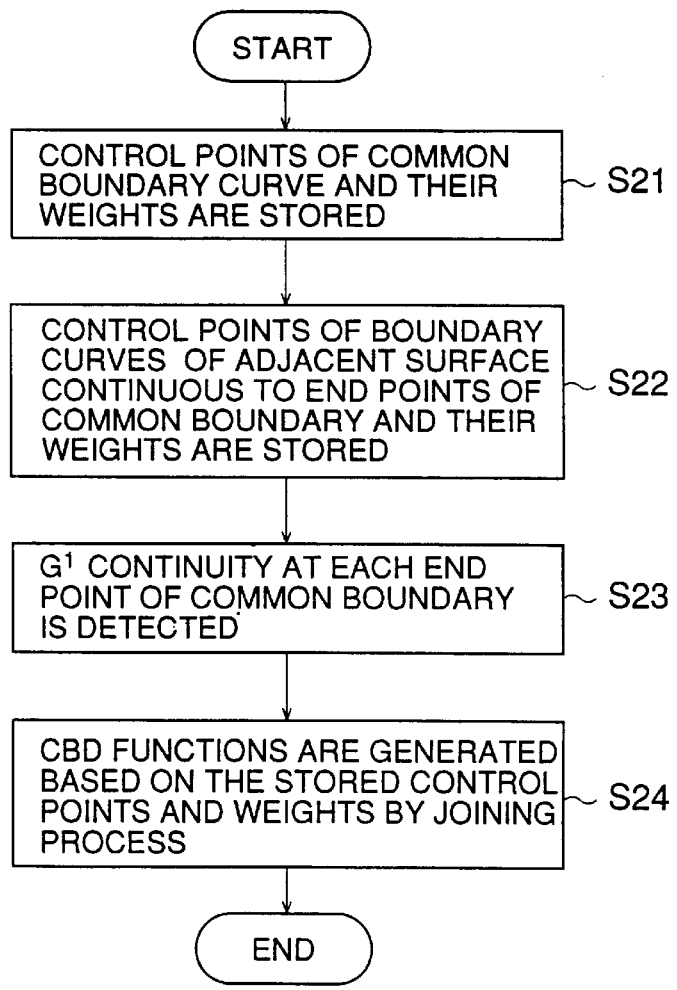

F I G. 5 A
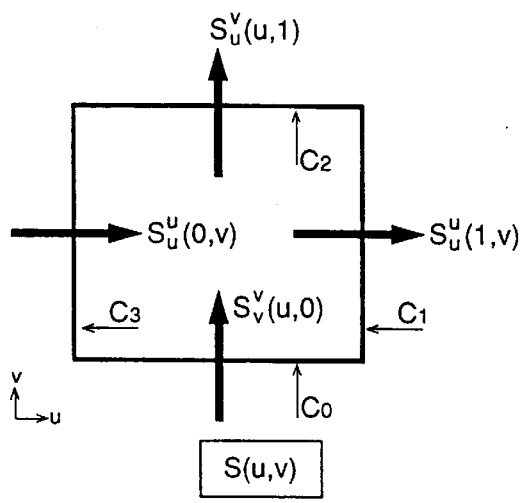
F I G. 5 B
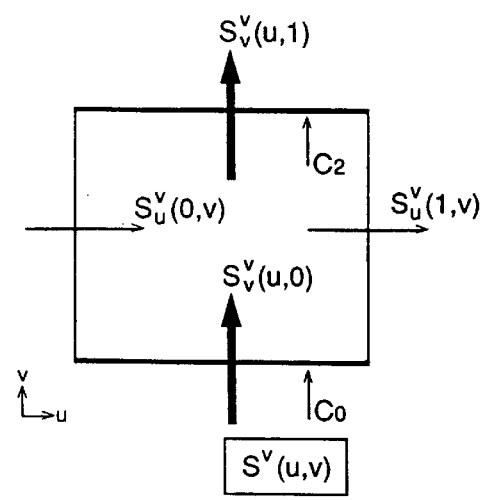
F I G. 5 C
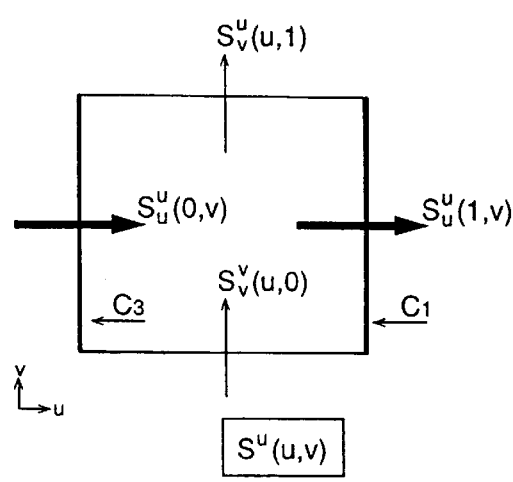
F I G. 5 D
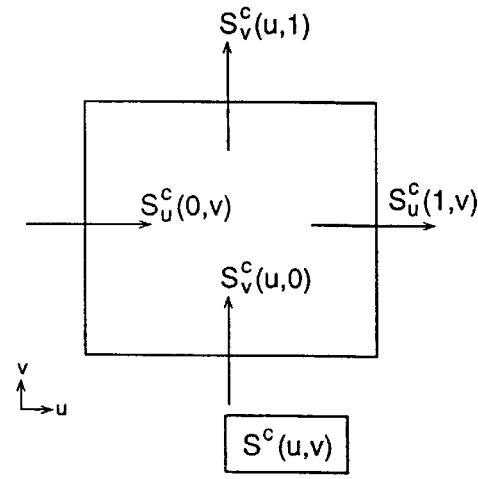

F I G. 13
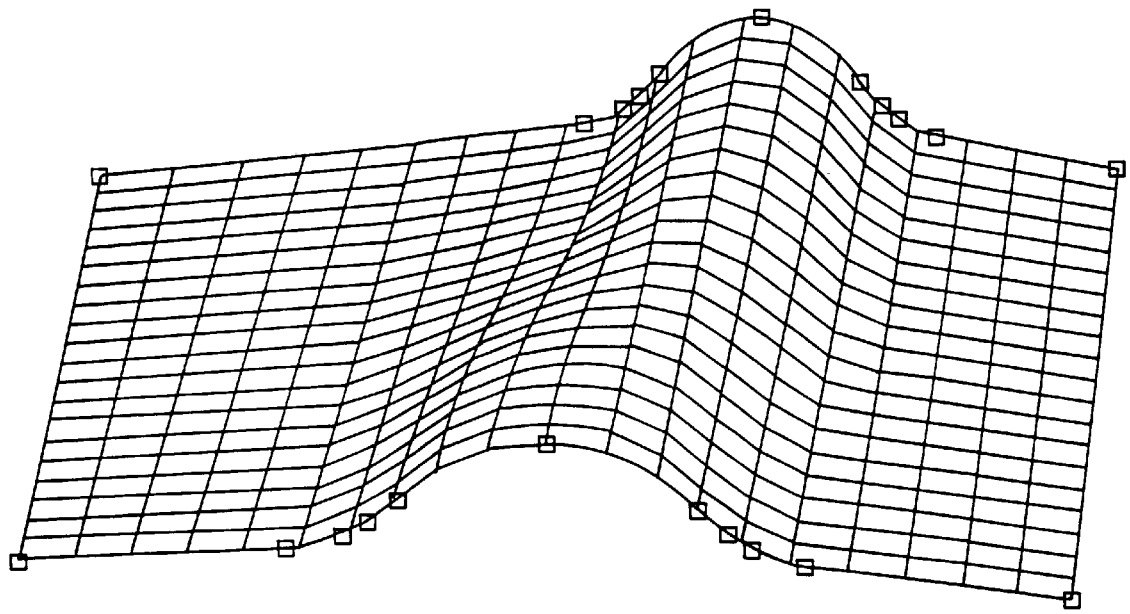
F I G. 14
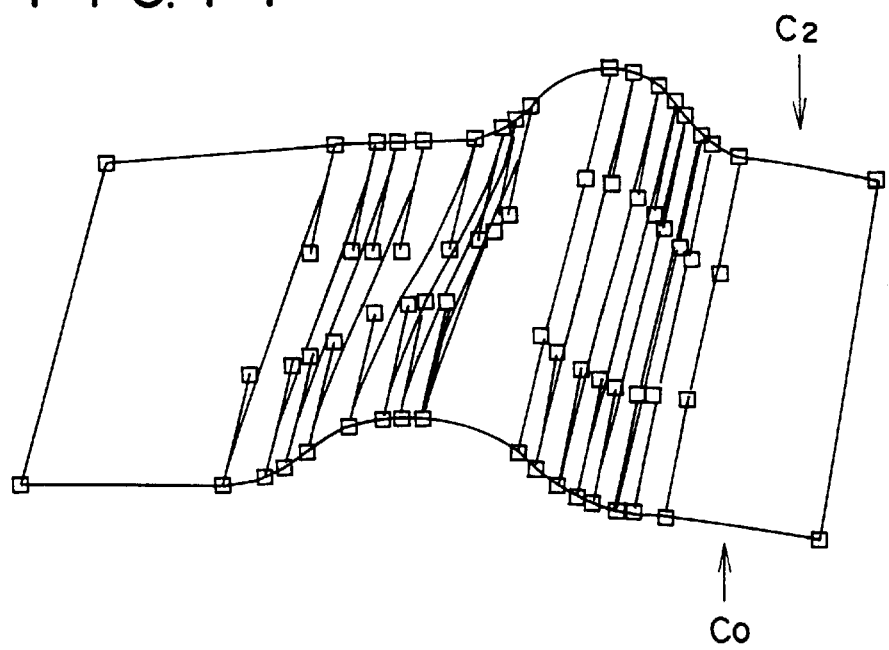

FREE-FORM SURFACE GENERATION FROM DETECTED GEOMETRIC CONTINUITY ON COMMON NURBS BOUNDARY CURVE

This application is a continuation of application Ser. No. 08/417,776, filed Apr. 6, 1995, now abandoned.

BACKGROUND OF THE INVENTION

The present invention generally relates to a free-form surface generating method, and more particularly to a free-form surface generating method which interpolates an irregular curve mesh including non-uniform rational B-spline (NURBS) curves, with a NURBS boundary Gregory patch with a continuity on a common boundary, and to a shape control method of controlling a shape of a generated surface. This invention can be applied to free-form surface generating processes and to surface shape modification processes performed on a 3-dimensional solid modeler.

Conventional free-form surface generating methods are disclosed in the following publications.

(1) "From Conics To NURBS: A Tutorial and Survey" G. Farin, IEEE Computer Graphics and Applications, Vol.12, No.5, pp.78–86, 1992.

(2) "A New Control Method for Free-Form Surfaces with Tangent Continuity and Its Applications" K. Konno, T. Takamura, and H. Chiyokura, Scientific Visualization of Physical Phenomena, reprint from N. M. Patrikalakis (Ed.), Springer-Verlag, Heidelberg, pp.435–456, 1991.

(3) "$G^1$ Surface Interpolation over Irregular Meshes with Rational Curves" H. Chiyokura, T. Takamura, K. Konno, and T. Harada, NURBS for Curve and Surface Design, G. Farin (Ed.), SIAM, Philadelphia, pp.15–34, 1991.

(4) "Expressing Coons-Gordon Surfaces as NURBS" F. Lin and W. T. Hewitt, IEEE Computer-Aided Design, Vol.26, No.2, pp.145–155, February 1994.

Various methods of representation of free-form surfaces using NURBS curves and surfaces or the like have been proposed in these publications.

The above publication (1) discloses geometric features of NURBS curves and surfaces and a shape modification method. In this publication, the representation of NURBS curves and surfaces, reparameterization, derivatives, and a shape control method by using control points and weights have been proposed. By using the proposed techniques, the free-form surface generation and shape control using NURBS surfaces can be carried out.

The above publication (2) discloses a shape modification method for free-form surfaces in which a Gregory patch or a general boundary Gregory patch is used. This method involves the concepts of surface interpolation and joining in which cross boundary derivative (CBD) functions are defined, and a shape modification method using the CBD functions.

The above publication (3) discloses a method of generating surfaces joined with a continuity by using the rational boundary Gregory patch.

The above publication (4) discloses a method for expressing a free-form surface by joining three NURBS surfaces. This publication teaches that three NURBS surfaces can be defined by a single NURBS representation.

The method of the above publication (3) teaches the surface interpoplation over irregular curve meshes, including no NURBS curves, with tangent continuity. The method of the above publication (2) teaches the surface interpolation over regular curve meshes, including NURBS curves, with tangent continuity. The method of the above publication (1) teaches the basic evaluation method for handling NURBS curves and surfaces.

However, when the above conventional surface interpolation methods are used, it is difficult to interpolate irregular curve meshes including NURBS curves with the NURBS representation so that free-form surfaces which are joined with tangent continuity on the common boundary are generated.

SUMMARY OF THE INVENTION

Accordingly, it is a general object of the present invention to provide an improved free-form surface generating method in which the above-mentioned problems are eliminated.

Another object of the present invention is to provide a free-form surface generating method which can interpolate irregular curve meshes including NURBS curves and surfaces with the NURBS representation, to generate free-form surfaces joined with tangent continuity on the common boundary.

Still another object of the present invention is to provide a surface shape control method which can efficiently control a shape of a free-form surface generated by the free-form surface generating method.

A further object of the present invention is to provide a freeform surface generating apparatus which can efficiently generate free-form surfaces joined with tangent continuity on the common boundary.

The above-mentioned object of the present invention is achieved by a free-form surface generating method includes steps of: generating a continuity condition by detecting a continuity on a common boundary of two free-form surfaces based on tangent vectors on a NURBS common boundary curve and tangent vectors on boundary curves continuous to end points of the common boundary curve; selecting one of a plurality of predetermined continuity conditions in accordance with the continuity condition; and generating internal control points of each of the two free-form surfaces based on the selected continuity condition so that the two free-form surfaces which are joined with continuity on the common boundary are generated.

The above-mentioned object of the present invention is achieved by a free-form surface generating apparatus which includes: a unit for receiving curve mesh data which represents a curve mesh; a processing unit for processing the curve mesh data to generate surface data; a memory device for storing the surface data; and a reference unit for retrieving the surface data from the memory device, wherein the processing unit generates two free-form surfaces which are joined with continuity on a common boundary defined by a NURBS common boundary curve, and comprises: a continuity condition unit for generating a continuity condition by detecting a continuity on the common boundary of two free-form surfaces based on tangent vectors on the NURBS common boundary curve and tangent vectors on boundary curves continuous to end points of the common boundary curve; a selecting unit for selecting one of a plurality of predetermined joining processes in accordance with the continuity condition; and a control point generating unit for generating internal control points of each of the two free-form surfaces based on the selected joining process so that the two free-form surfaces which are joined with continuity on the common boundary are generated.

According to the present invention, the surface interpolation over irregular curve meshes including NURBS curves can be carried out with tangent continuity. The NURBS boundary Gregory (NBG) patch according to the present invention has the following advantages when the curve meshes are interpolated by using this patch.

(1) Two surfaces which smoothly join on a common boundary defined by a NURBS curve can be generated.

(2) A complex shape of a surface can be suitably modified by using a simple curve mesh since the common boundary of the surfaces is defined by a NURBS curve.

(3) A visual shape modification is realized by using cross boundary derivative functions and internal control points of the surface.

(4) The NBG patch of the present invention makes it possible to prevent the curve mesh used to generate a fillet surface from becoming complex.

(5) The NBG patch of the present invention makes it possible to smoothly join it with any of a Gregory patch, a rational boundary Gregory patch, a general boundary Gregory patch, and a NURBS surface.

By using the NBG patch of the present invention, designers can readily control the shape of a surface with no need for taking into consideration the continuity with adjacent surfaces and the type of curves.

BRIEF DESCRIPTION OF THE DRAWINGS

Other objects, features and advantages of the present invention will be more apparent from the following detailed description when read in conjunction with the accompanying drawings in which:

FIG. 3 is a flow chart for explaining a process of surface interpolation over curve meshes;

FIG. 4 is a flow chart for explaining a process of determining cross boundary derivative functions;

FIGS. 5A through 5D are diagrams for explaining the concept of a NURBS boundary Gregory patch according to the present invention;

FIG. 13 is a diagram showing parametric lines of a NURBS surface;

FIG. 14 is a diagram showing control points and guide curves obtained from derivative vectors lying on joints of the NURBS surface;

DESCRIPTION OF THE PREFERRED EMBODIMENTS

A description will now be given of a CAD (computer-aided design) system on which a free-form surface generating method in one embodiment of the present invention is carried out.

Figure 1:
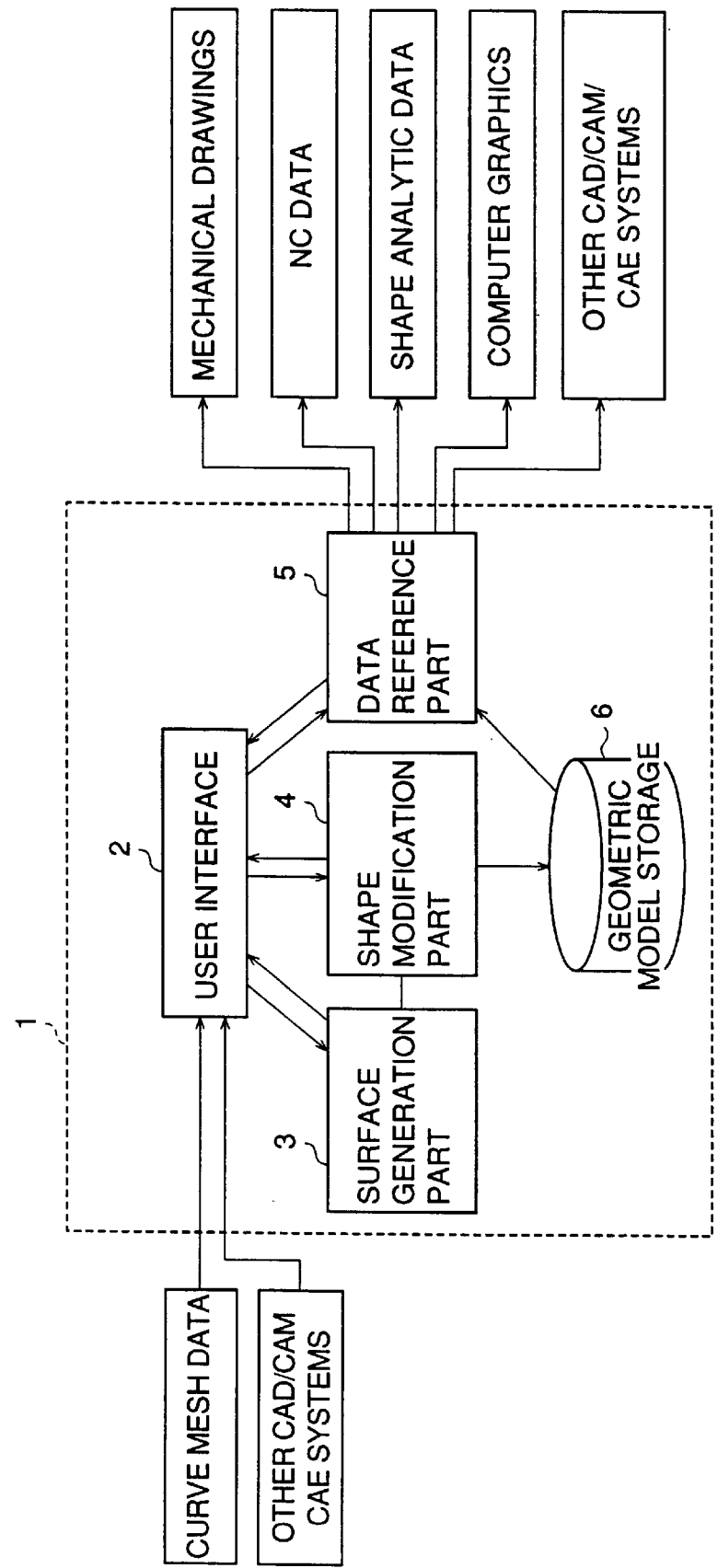
FIG. 1 is a block diagram of a CAD system on which a free-form surface generating method in one embodiment of the present invention is carried out.

FIG. 1 shows a CAD system 1 according to the present invention. This CAD system 1 includes a user interface unit 2, a surface generation unit 3, a shape modification unit 4, a data reference unit 5, and a geometric model storage 6.

When a free-form surface is generated, the user interface unit 2 receives curve mesh data. A surface generating command is sent to the surface generation unit 3 and the data reference unit 4. The surface generation unit 3 carries out the curve mesh interpolation and surface generation based on the curve mesh data from the user interface unit 2 and the data retrieved from the geometric model storage 6 through the data reference unit 5. The generated surfaces are transferred to the shape modification unit 4.

To modify the shape of the generated surfaces, a shape modification command is sent to the shape modification unit 4 and the data reference unit 5. The shape modification unit 4 carries out the shape modification based on the generated surface data from the surface generation unit 3 and the data retrieved from the geometric model storage 6 through the data reference unit 5. The modified shape data from the shape modification unit 4 is stored in the geometric model storage 6.

The data reference unit 5, when instructed, can access data stored in the geometric model storage 6, and transfer the data to various devices for creating mechanical drawings, NC data, shape analytic data and computer graphics, or other CAD/CAM/CAE systems. CAM is the abbreviation of computer-aided manufacturing, and CAE is the abbreviation of computer-aided engineering.

Next, a description will be given of a free-form surface generating method in one embodiment of the present invention.

Figure 2:
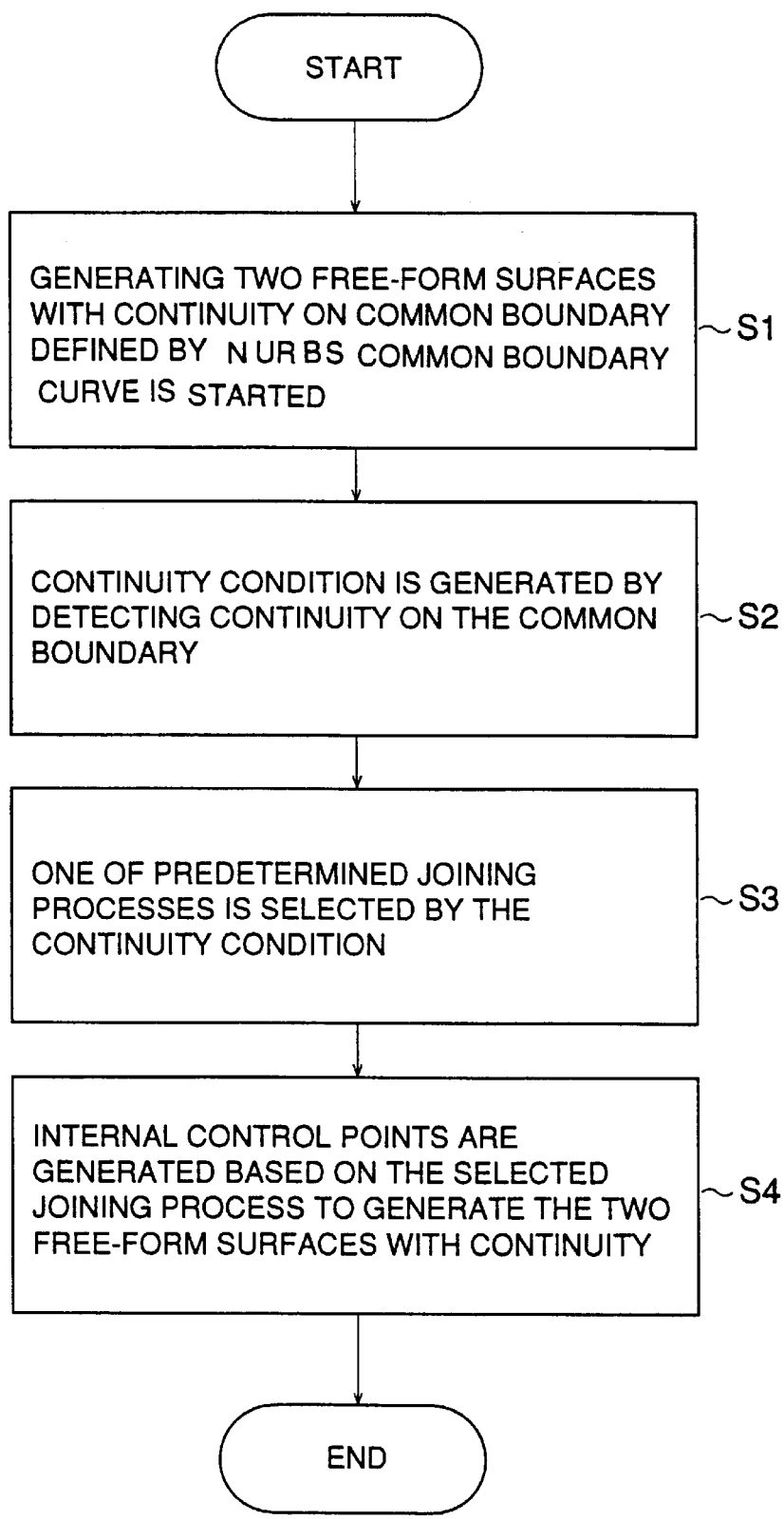
FIG. 2 is a flow chart for explaining the free-form surface generating method in one embodiment of the present invention.

FIG. 2 shows a free-form surface generating procedure in one embodiment of the present invention. In the step in FIG. 2, the procedure of generating two free-form surfaces with $G^1$ continuity on a common boundary defined by a NURBS common boundary curve is started.

In the step S2, a continuity condition is generated by detecting a continuity on a common boundary of two free-form surfaces based on tangent vectors on the NURBS common boundary curve and tangent vectors on boundary curves continuous to end points of the NURBS common boundary curve.

In the step S3, one of a plurality of predetermined joining processes is selected in accordance with the generated continuity condition.

In the step S4, internal control points of each of the two free-form surfaces are generated based on the selected joining process so that the two free-form surfaces which are joined with continuity on the common boundary are generated.

The above free-form surface generating method makes it possible to interpolate an irregular curve mesh including NURBS curves and surfaces with the two free-form surfaces with $G^1$ continuity on the common boundary.

In order to realize the above free-form surface generating method according to the present invention, it is necessary to carry out the following two procedures:

(1) interpolation of a curve mesh by using a NURBS boundary Gregory (NBG) patch.

(2) joining of two surfaces with $G^1$ continuity on boundary curves of the NURBS boundary Gregory (NBG) patch by setting cross boundary derivative (CBD) functions of the boundary curves.

FIG. 3 shows the above interpolation procedure (1). In the step S11 in FIG. 3, CBD (cross boundary derivative) functions of all the boundary curves for A rational surface to be generated are generated and stored in a memory device.

In the step S12, control points of the rational surface are generated based on the CBD functions.

FIG. 4 shows the above joining procedure (2). In the step S21 in FIG. 4, control points of a common boundary curve and their weights are stored in a memory device.

In the step S22, control points of boundary curves of the adjacent surface which curves are continuous to end points of the common boundary curve, and their weights are stored in the memory device.

In the step S23, $G^1$ continuity at each end point of the common boundary curve is detected, and a continuity condition is generated and stored in the memory device.

In the step S24, CBD functions are generated based on the control points and weights, stored in the above steps S21 and 22, in accordance with one joining process selected by the continuity condition in the above step S23.

(1) Representation and Features of NURBS Boundary Gregory Patch

Next, a description will be given of the representation of a NURBS boundary Gregory patch according to the present invention and its features.

(1-1) Concept of NURBS Boundary Gregory Patch

The NURBS boundary Gregory patch according to the present invention is an extended concept from the concept of the generalized boundary Gregory patch. This patch is used to represent a surface wherein boundary curves of the surface are defined by NURBS curves.

Generally, a NURBS boundary Gregory patch $S(u,v)$ is defined by the following equation.

$$S(u, v) = S^u(u, v) + S^v(u, v) - S^c(u, v) \qquad (1)$$

| | |
|---|---|
| $S[1u] \to S^{1u}$ | $S[2u] \to S^{2u}$ |
| $S[u] \to S^u$ | $P[1u/2i] \to P_{2i}^{1u}$ |
| $S[u/u](0, v) \to S_u^u(0, v)$ | $P[1u/3i] \to P_{3i}^{1u}$ |
| $S[u/u](1, v) \to S_u^u(1, v)$ | $P[2u/0i] \to P_{0i}^{2u}$ |
| $S[v] \to S^v$ | $P[2u/1i] \to P_{1i}^{2u}$ |
| $S[v/v](u, 0) \to S_v^v(u, 0)$ | $P[1u/j3] \to P_{j3}^{1u}$ |
| $S[v/v](u, 1) \to S_v^v(u, 1)$ | $W[1u/2j] \to W_{2j}^{1u}$ |
| $S[c](u, v) \to S^c(u, v)$ | $W[1u/3j] \to W_{3j}^{1u}$ |
| $S[u](u, 0) \to S^u(u, 0)$ | $W[2u/0j] \to W_{0j}^{2u}$ |
| $S[u](u, 1) \to S^u(u, 1)$ | $W[2u/1j] \to W_{1j}^{2u}$ |
| $S[u/v](u, 0) \to S_v^u(u, 0)$ | $P[1u/ij] \to P_{ij}^{1u}$ |
| $S[u/v](u, 1) \to S_v^u(u, 1)$ | $W[1u/ij] \to W_{ij}^{1u}$ |
| $S[v](0, v) \to S^v(0, v)$ | $P[2u/ij] \to P_{ij}^{2u}$ |
| $S[v](1, v) \to S^v(1, v)$ | $W[2u/ij] \to W_{ij}^{2u}$ |
| $S[v/u](0, v) \to S_u^v(0, v)$ | $B[m/j](v) \to B_j^m(v)$ |
| $S[v/u](1, v) \to S_u^v(1, v)$ | $P[2u/ij] \to P_{ij}^{2u}$ |
| $S[c] \to S^c$ | $W[2u/ij] \to W_{ij}^{2u}$ |
| $P[u/v, j] \to P_{0,j}^u$ | $P[1u/30] \to P_{30}^{1u}$ |
| $W[u/0, j] \to W_{0,j}^u$ | $P[1u/33] \to P_{33}^{1u}$ |
| $P[u/3, j] \to P_{3,j}^u$ | $P[2u/00] \to P_{00}^{2u}$ |
| $W[u/3, j] \to W_{3,j}^u$ | $W[2u/10] \to W_{10}^{2u}$ |
| $S[u](0, v) \to S^u(0, v)$ | $W[1u/20] \to W_{20}^{1u}$ |
| $S[u](1, v) \to S^u(1, v)$ | $W[2u/14] \to W_{14}^{2u}$ |
| $P[d/ij0] \to P_{ij0}^d$ | $W[1u/23] \to W_{23}^{1u}$ |
| $W[d/ij0] \to W_{ij0}^d$ | $S[u](u_0, v_0) \to S^u(u_0, v_0)$ |
| $P[d/ij1] \to P_{ij1}^d$ | $S[v](u_0, v_0) \to S^u(u_0, v_0)$ |
| $W[d/ij1] \to W_{ij1}^d$ | |
| $W[c/ij0] \to W_{ij0}^c$ | |

In the following descriptions, the notations with superscripts and subscripts in various equations in the present specification will be labeled by the corresponding characters with angle brackets and a virgule, e.g. $S[u/u]$. The relationship between the labels and the notations is shown in TABLE 1 above.

By referring to FIGS. 5A through 5D, a description will be given of the concept of the NURBS boundary Gregory patch according to present invention. FIG. 5A illustrates the NURBS boundary Gregory patch $S(u,v)$ which is defined by the above Equation (1). FIG. 5B illustrates a surface $S[v]$ which is defined by one set of two NURBS curves $C_0$ and $C_2$ and the CBD functions $S[v/v](u,o)$ and $S[v/v](u,1)$ on the respective boundaries thereof. FIG. 5C illustrates a surface $S[u]$ which is defined by one set of two NURBS curves $C_3$ and $C_1$ and the CBD functions $S[u/u](0,v)$ and $S[u/u](1,v)$ on the respective boundaries thereof.

In the above representation, $S_u = \partial S/\partial u$ and $S_v = \partial S/\partial v$.

FIG. 5D illustrates a surface $S[c](u,v)$ which is a redundant term resulting from the addition of these two surfaces $S[u]$ and $S[v]$. This surface $S[c](u,v)$ is defined by various CBD functions including $S[u](u,0)$, $S[u](u,1)$, $S[u/v](u,0)$ and $S[u/v](u,1)$, which result from the surface $S[u]$, and $S[v](0,v)$, $S[v](1,v)$, $S[v/u](0,v)$ and $S[v/u](1,v)$, which result from the surface $S[v]$.

Hereinafter, the above three surfaces $S[u]$, $S[v]$, and $S[c]$ will respectively be called the U surface, the V surface, and the C surface of the NURBS boundary Gregory patch.

(1-2) Representation of NURBS Boundary Gregory Patch

The NURBS boundary Gregory patch described above is an extended concept of the generalized boundary Gregory patch. Hereinafter, the NBG patch refers to the NURBS boundary Gregory patch. The CBD functions on the boundaries of an NBG patch can be defined by the NURBS representation. The boundary curves of the NBG patch are defined by NURBS curves.

Next, the meanings of the respective terms of the above Equation (1) will be described. The parametric spaces of the U surface S[u] and the V surface S[v] differ from each other, but the representation of the two surfaces may be considered the same. Therefore, only a description of the U surface S[u] and the C surface S[c] will be given in the following, and a description of the V surface S[v] will be omitted for the sake of convenience.

The U surface S[u] is defined by the two boundary curves $C_3$ and $C_1$ and the CBD functions thereof. The boundary curve $C_3$ is a NURBS curve of degree k including (n+1) control points P[u/0,j] and those corresponding weights w[u/O,j]. Similarly, the boundary curve $C_1$ is a NURBS curve of degree k including (n+1) control points P[u/3,j] and those corresponding weights w[u/3,j].

These boundary curves $C_3$ and $C_1$ are represented by $$C_3(v) = \frac{\sum_{j=0}^{n} N_{j,k}(v) w_{0,j}^u P_{0,j}^u}{\sum_{j=0}^{n} N_{j,k}(v) w_{0,j}^u}, \quad (2)$$

$$C_1(v) = \frac{\sum_{j=0}^{n} N_{j,k}(v) w_{3,j}^u P_{3,j}^u}{\sum_{j=0}^{n} N_{j,k}(v) w_{3,j}^u},$$

wherein $N_{j,k}(v)$ is a B-spline basis function which is defined by the following equations (3).

$$N_{j,0}(v) = \begin{cases} 1 & \text{if } v_j \leq v < v_{j+1} \\ 0 & \text{otherwise} \end{cases} \quad (3)$$

$$N_{j,k}(v) = \frac{(v - v_j) N_{j,k-1}(v)}{v_{j+k-1} - v_j} + \frac{(v_{j+k} - v) N_{j+1,k-1}(v)}{v_{j+k} - v_{j+1}}$$

wherein $v_j$ is a normalized knot vector. This normalized knot vector is defined as follows.

v-directional knot vector = (4)

$$[\underbrace{0, \ldots, 0}_{(k+1)}, \underbrace{V_o, \ldots, V_0, \ldots}_{k}, \underbrace{V_j, \ldots, V_j, \ldots}_{k}, \underbrace{1, \ldots, 1}_{(k+1)}]$$

In order to define the CBD functions S[u/u](0,v) and S[u/u](1,v) by the NURBS representation, the U surface S[u] is defined as a NURBS surface which follows.

$$S^u(u,v) = \frac{\sum_{i=0}^{3} \sum_{j=0}^{n} M_{i,3}(u) N_{j,k}(v) w_{i,j}^u P_{i,j}^u}{\sum_{i=0}^{3} \sum_{j=0}^{n} M_{i,3}(u) N_{j,k} w_{i,j}^u} \quad (5)$$

wherein $M_{i,3}$ and $N_{j,k}$ are the same as the B-spline basis function of the above Equations (3), a u-directional knot vector is [0,0,0,0,1,1,1,1], and a v-directional knot vector is the same as that of the above Equation (4).

Similarly to the U surface S[u], the V surface S[v] can be defined as a NURBS surface in the same manner.

Figure 6:
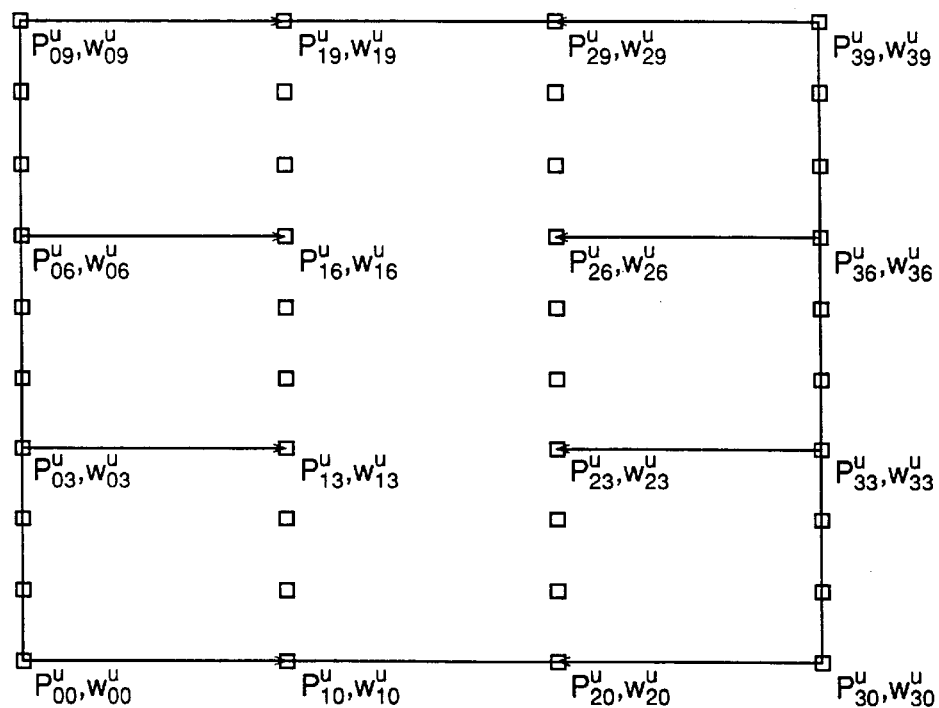
FIG. 6 is a diagram showing a U surface of a NURBS boundary Gregory patch according to the present invention.
Figure 7:
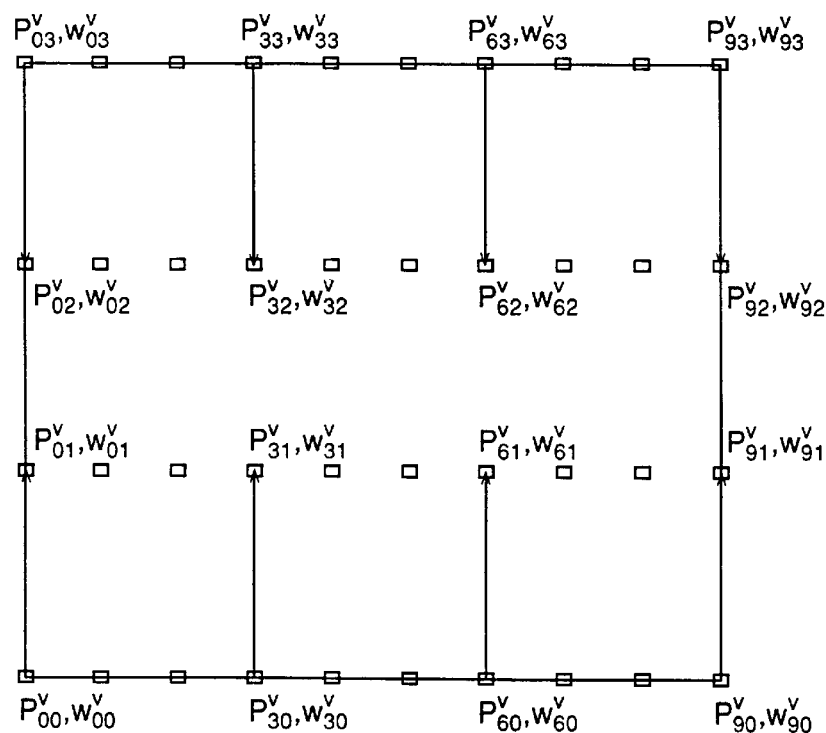
FIG. 7 is a diagram showing a V surface of the NURBS boundary Gregory patch according to the present invention.

FIGS. 6 and 7 show a U surface and a V surface of a NBG patch according to the present invention, respectively. For the sake of convenience, the boundary curves of the NBG patch are NURBS curves of degree 3 including ten control points. That is, n=9, k=3. As shown in FIG. 6,, the boundary curves S[u](0,v) and S[u](1,v) are each composed of three curve segments. A part of a bicubic NURBS surface is represented by these boundary curves.

As described above, a C surface of the NBG patch is a redundant part resulting from the addition of the U and V surfaces.

According to the above Equation (1), when u=0 and u=1, the U surface S[u] has to satisfy the following boundary conditions.

$$S(0,v) = S^u(0,v), \quad S(1,v) = S^u(1,v),$$
$$S_u(0,v) = S_u^u(o,v), \quad S_u(1,v) = S_u^u(1,v),$$

Also, when v=0 and v=1, the V surface S[v] has to satisfy boundary conditions which are similar to the above-mentioned conditions. Accordingly, the C surface S(c] has to satisfy the following conditions in accordance with the boundary conditions of the U and V surfaces S[u] and S(v).

$$\begin{aligned}
S^u(u,0) &= S^c(u,0), & S^u(u,1) &= S^c(u,1), \\
S^v(0,v) &= S^c(0,v), & S^v(1,v) &= S^c(1,v), \\
\partial S^u(u,0)/\partial v &= \partial S^c(u,0)/\partial v, & \partial S^u(u,1)/\partial v &= \partial S^c(u,1)/\partial v, \\
\partial S^v(0,v)/\partial v &= \partial S^c(0,v)/\partial u, & \partial S^v(1,v)/\partial u &= \partial S^c(1,v)/\partial u.
\end{aligned} \quad (6)$$

The CBD functions of the C surface S[c] are restricted by the two surfaces S[u] and S[v]. It is necessary to represent the CBD functions in a manner that the CBD functions can be controlled independently by the parameters u and v. Accordingly, $S^c$ is defined by the following rational function.

$$S^c(u,v) = \frac{\sum_{i=0}^{3} \sum_{j=0}^{3} B_i^3(u) B_j^3(v) P_{ij}^c(u,v)}{\sum_{i=0}^{3} \sum_{j=0}^{3} B_i^3(u) B_j^3(v) w_{i,j}^c(u,v)} \quad (7)$$

wherein when i=0, 1 and j=0, 1, $$P_{ij}^c(u,v) = \frac{u^2 w_{ij0}^d P_{ij0}^d + v^2 w_{ij1}^d P_{ij1}^d}{u^2 + v^2}, \quad (8)$$

$$w_{ij}^c(u,v) = \frac{u^2 w_{ij0}^d + v^2 w_{ij1}^d}{u^2 + v^2}, \quad (9)$$

when i=0, 1 and j=2, 3, $$P_{ij}^c(u,v) = \frac{u^2 w_{ij0}^d P_{ij0}^d + (1-v)^2 w_{ij1}^d P_{ij1}^d}{u^2 + (1-v)^2}, \quad (10)$$

$$w_{ij}^c(u,v) = \frac{u^2 w_{ij0}^d + (1-v)^2 w_{ij1}^d}{u^2 + (1-v)^2}, \quad (11)$$

when i=2, 3 and j=0, 1

$$P_{ij}^c(u,v) = \frac{(1-u)^2 w_{ij0}^d P_{ij0}^d + v^2 w_{ij1}^d P_{ij1}^d}{(1-u)^2 + v^2}, \quad (12)$$

$$w_{ij}^c(u,v) = \frac{(1-u)^2 w_{ij0}^d + v^2 w_{ij1}^d}{(1-u)^2 + v^2}, \quad (13)$$

when i=2, 3 and j=2, 3, $$P_{ij}^c(u,v) = \frac{(1-u)^2 w_{ij0}^d P_{ij0}^d + (1-v)^2 w_{ij1}^d P_{ij1}^d}{(1-u)^2 + (1-v)^2}, \qquad (14)$$

$$w_{ij}^c(u,v) = \frac{(1-u)^2 w_{ij0}^d + (1-v)^2 w_{ij1}^d}{(1-u)^2 + (1-v)^2} \qquad (15)$$

Figure 8:
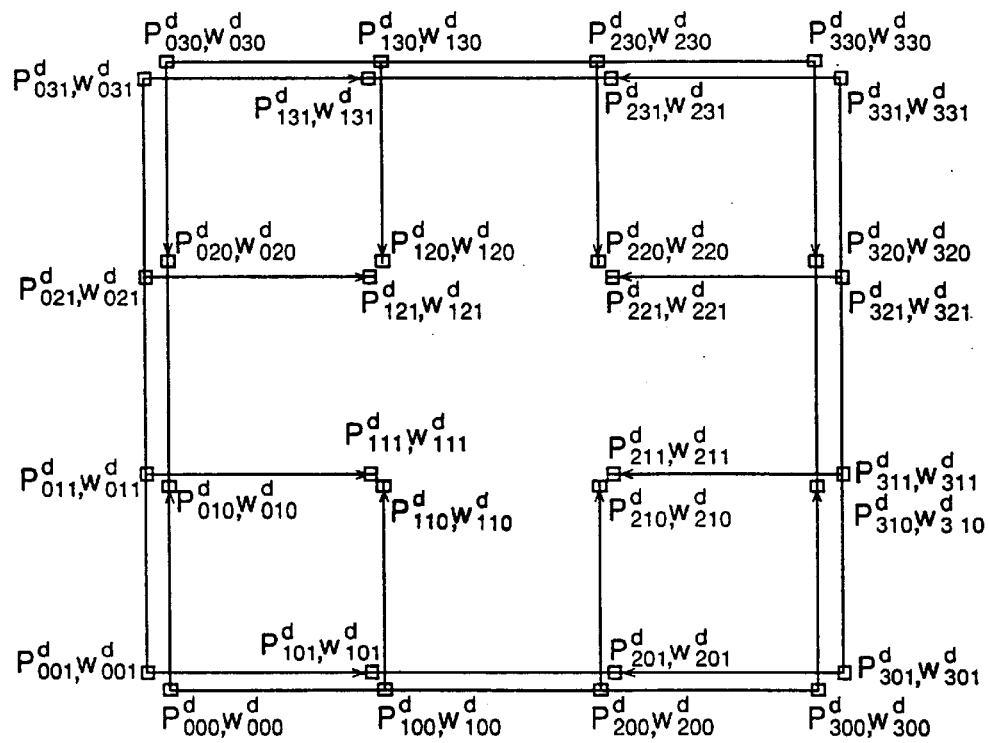
FIG. 8 is a diagram showing a C surface of the NURBS boundary Gregory patch according to the present invention.

The C surface S[c] is defined by 32 control points. FIG. 8 shows a layout for these control points and corresponding weights. As shown in FIG. 8, the C surface includes the boundary representing control points and the CBD representing control points which appear in a duplicate manner. The terms of the control points P[d/ij0] and the weights w[d/ij0] are zero when u=0 or u=1. The terms of the control points P[d/ij1] and the weights w[d/ij1] are zero when v=0 or v=1. Accordingly, the control points P[d/ij0] and the weights w[d/ij0] can be obtained from the U surface, and the control points P[d/ij1] and the weights w[d/ij1] can be obtained from the V surface.

By applying the above Equations (6) to the above Equation (7), the control points P[d/ij0] and the weights w[d/ij0] of the U surface are defined as follows.

When ij=01, 11, 21, 31, $$P_{010}^d = P_{00}^u + v_0 * (P_{01}^u - P_{00}^u), \; w_{010}^d = w_{01}^u, \qquad (16)$$

$$P_{110}^d = P_{10}^u + v_0 * (P_{11}^u - P_{10}^u), \; w_{110}^d = w_{11}^u,$$

$$P_{210}^d = P_{20}^u + v_0 * (P_{21}^u - P_{20}^u), \; w_{210}^d = w_{21}^u,$$

$$P_{310}^d = P_{30}^u + v_0 * (P_{31}^u - P_{30}^u), \; w_{310}^d = w_{31}^u,$$

When ij=02, 12, 22, 32, $$P_{020}^d = P_{03}^u + v_1 * (P_{03}^u - P_{02}^u), \; w_{020}^d = w_{02}^u, \qquad (17)$$

$$P_{120}^d = P_{13}^u + v_1 * (P_{13}^u - P_{12}^u), \; w_{120}^d = w_{12}^u,$$

$$P_{220}^d = P_{23}^u + v_1 * (P_{23}^u - P_{22}^u), \; w_{220}^d = w_{22}^u,$$

$$P_{320}^d = P_{33}^u + v_1 * (P_{33}^u - P_{32}^u), \; w_{320}^d = w_{32}^u.$$

In the above Equations (16) and (17), $v_0$ and $v_1$ are v-directional knots at the control points P[u/03] and P[u/06] of the U surface.

When ij is not equal to 01, 11, 21, 31, 02, 12, 22, 32, $$p_{ij0}^d = p_{ij}^u, \; w_{ij0}^d = w_{ij}^u \qquad (18)$$

At this time, the four corners of the C surface must accord with those of the U and V surfaces.

$$p_{000}^d = p_{001}^d, \; p_{300}^d = p_{301}^d, \qquad (19)$$

$$p_{030}^d = p_{031}^d, \; p_{330}^d = p_{331}^d.$$

Similarly to the above-described U surface, the control points P[d/ij1] and the weights w[d/ij1] of the V surface can also be defined in the same manner.

(1-3) Features of NURBS Boundary Gregory Patch

The NURBS boundary Gregory patch according to the present invention has various advantageous features which follows:

A. The cross boundary derivative (CBD) functions on the boundaries can be defined independently for each boundary. The C surface of the NBG patch is defined to satisfy the boundary conditions of the above Equations (6). For example, when u=0, $S_u(0,v) = S[u/u](0,v)$. Accordingly, this will make it possible to carry out the surface interpolation over irregular curve meshes with tangent continuity.

B. The boundary curves of the NBG patch can be controlled independently. According to the Equation (1), the U surface and the V surface can be set independently and the constraints of the boundary curves are the above Equations (19) only. Accordingly, the weights of the end points of the boundary curves can be controlled independently for each boundary.

C. The boundary curves of the NBG patch are defined as NURBS curves.

D. The NBG patch of the present invention can be connected to any of the Gregory patch, the rational boundary Gregory patch, and the general boundary Gregory patch with tangent continuity.

The CBD functions are defined by the NURBS representation. The extended concept of the NBG patch according to the present invention includes the rational Bezier representation. Accordingly, when the boundary curve is defined as a Bezier curve, internal control points are determined by using the continuity condition of the Gregory patch. When the boundary curves are defined by rational Bezier curves, CBD functions are determined by using the continuity condition of the rational boundary Gregory (RBG) patch. In any case, the NBG patch of the present invention can be connected to any of these curves with tangent continuity.

E. The NBG patch of the present invention can be transformed into NURBS representation of a single surface. The U and V surfaces of the NBG patch are represented by NURBS surfaces. The C surface of the NBG patch is represented in the same manner as that of the rational boundary Gregory patch. According to algebraic theorem, rational functions which describe three NURBS surfaces joined together can be expressed in the NURBS representation of a single NURBS surface. Therefore, the NBG patch of the present invention can accurately be transformed into the NURBS representation of a single NURBS surface.

(2) Method of Joining NBG Patches with $G^1$ Continuity

Figure 9:
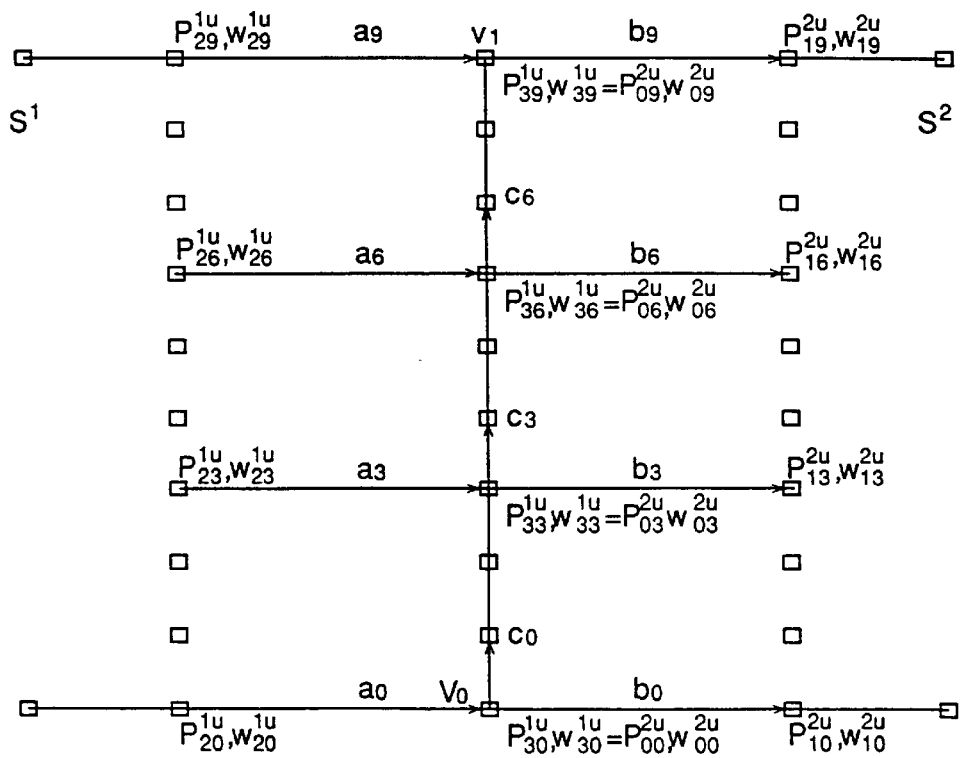
FIG. 9 is a diagram showing a joining of two NURBS boundary Gregory patches with tangent continuity according to the present invention.

FIG. 9 shows a method of joining two NBG (NURBS boundary Gregory) patches described above with $G^1$ continuity. In FIG. 9, the two NBG patches indicating two surfaces $S^1$ and $S^2$ are located with a common boundary therebetween which is defined by a NURBS curve.

For the sake of convenience, the common boundary is defined as a NURBS curve of degree 3 including two joints at intermediate locations of the curve. Generally, a continuity condition which is sufficient for the two surfaces $S^1$ and $S^2$ to join with $G^1$ continuity is represented as follows.

$$\frac{\partial S^2(0,v)}{\partial u} = k(v) \frac{\partial S^1(1,v)}{\partial u} + h(v) \frac{\partial S^1(1,v)}{\partial v} \qquad (20)$$

wherein k(v) and h(v) are arbitrary scaler functions.

The above equation (20) can be rewritten to the following equation according to the abovementioned feature of the NBG patch of the present invention.

$$S_u^{2u}(0,v) = k(v) S_u^{1u}(1,v) + h(v) S_u^{1u}(1,v) \qquad (21)$$

In the above Equation (21), S[1u] refers to the U surface of the NBG patch $S^1$ and S[2u] refers to the U surface of the NBG patch $S^2$. Thus, only the U surfaces of the two NBG patches are taken into consideration when the above continuity condition is generated.

Accordingly, in the following, a method of joining the two U surfaces S[1u] and S[2u] will be taken into consideration.

A set of vectors between control points on curves continuous end points $V_0$ and $V_1$ of the boundary curve is defined as follows.

$$a_i = P_{3i}^{1u} - P_{2i}^{1u}, \; b_i = P_{1i}^{2u} - P_{0i}^{2u}, \; c_j = P_{j+1,3}^{1u} - P_{j3}^{1u} \qquad (22)$$

wherein i=0, ..., 9 and j=0, ..., 8. In FIG. 9, P[1u/2j] and P[1u/3j] are control points on the U surface S[1u], and P[2u/1i] and P[2u/1i] are control points on the U surface S[2u]. P[1u/j3] are control points on the boundary curve.

The control vectors of the above Equations (22) represent the cross boundary derivatives of the boundary of the two U surfaces.

Generally, the u- and v-directional differential equations obtained from the above Equation (5) will become complex, and it is difficult to directly solve the above Equation (21).

In order to resolve the above problem, the v-directional knot vector of the U surfaces is limited to the form of the above Equation (4), and a method of joining the two U surfaces with $G^1$ continuity which uses a conventionally established continuity condition will be taken into consideration.

By using only the knot vector in the form of the above Equation (4), the boundary curve and the CBD functions thereof can be handled by a rational Bezier method. Accordingly, by taking into account each of curve segments (subdivisions) between joints of the boundary curve and the CBD thereof and joining the respective curve segments with $G^1$ continuity, it is possible to join the two U surfaces with $G^1$ continuity.

When the above method of joining the two U surfaces with $G^1$ continuity is used, it is assumed that all the vectors ($a_i$ and $b_i$ for i=3, 6 in FIG. 9) between control points which correspond to the joints of the boundary curve are already known. These vectors are specified from the external, and used to perform a surface shape control process which will be described later.

When two of subdivided curve segments of the boundary curve are joined together with $G^1$ continuity, vectors $b_0$ and $b_9$ can be generated from the curves continuous to the end points of the boundary curve, and the vectors $a_i$ and $b_i$ (i=3, 6) are already known, as described above.

Accordingly, in order to join the two U surfaces with $G^1$ continuity, it is necessary to generate a continuity condition for joining two subdivided curve segments (rational Bezier curves) between knots with $G^1$ continuity.

In the following, some procedures of generating vectors $b^1$ and $b^2$, shown in FIG. 9, in one embodiment of the present invention will be explained. These procedures are classified into two methods. One method is to generate the vectors $a^1$, $a^2$, $b^1$ and $b^2$ of the two U surfaces when a continuity condition for joining two NBG patches with $G^1$ continuity is generated. These vectors can be generated by using a basis patch method. The other is to generate the vectors $b^1$ and $b^2$ of the U surface when a continuity condition for joining an NBG patch and a fixed NURBS surface with $G^1$ continuity is generated.

A. Generating Continuity Condition By Using Basis Patch Method

The control points P[1u/ij] and the weights w[i1/ij] (i=2, 3; j=0, . . . ,3) and the control points P[2u/ij] and the weights w[2u/ij] (i=0, 1; j=0, . . . ,3), which are related to the subdivided curve segments of the boundary curve, are applied to the above Equation (21). In order to simplify differential equations obtained from the Equation (5), it is predetermined that the weights satisfy the following constraints.

$$w_{2j}^{1u} = w_{3j}^{1u} = w_{0j}^{2u} = w_{1j}^{2u} \quad (23)$$

wherein j=0, . . . ,3. If the control vectors $b_0$ and $b_3$ on the curves continuous to the end points of the boundary curve satisfy these conditions:

$$b_0 = k_0 a_0, \ b_3 = k_1 a_3 \quad (24)$$

it is possible to set the scaler function h(v)=0. This allows the Equation (21) to be rewritten to the following equation.

$$\sum_{j=0}^{m} B_j^m(v) w_j b_j = k(v) \sum_{j=0}^{3} B_j^3(v) w_{3j}^{1u} a_j \quad (25)$$

wherein m is a degree, $w_j$ are weights of the U surface $S^2$, and B[m/j](v) is a Bernstein polynomial which is defined as follows:

$$B_j^m(v) = \binom{m}{j} v^j (1-v)^{m-j} \quad (26)$$

If it is assumed that the scaler function k(v) in the above Equation (25) is a linear function like $k(v)=k_0(1-v)+k_1 v$, the degree number of the right term of the Equation (25) must be 4. This indicates that the continuity between the two surfaces $S^1$ and $S^2$ is not compatible.

The compatibility of the continuity between the two surfaces with respect to the Equation (25) can be kept by correcting the terms of $a_j$ (j=0, . . . ,3) to quadratic terms by using the basis patch method. That is, the sum $\Sigma_{j=0}^{3} w[1u/3j] \cdot a_0$ is defined by three terms: $w[1u/30] \cdot a_0$, q, and $w[1u/33] \cdot a_3$, and the control vectors $a_1$ and $a_2$ are determined as $$a_1 = (2q + w_{30}^{1u} a_0)/3 w_{31}^{1u}, \ a_2 = (2q + w_{33}^{1u} a_3)/3 w_{32}^{1u}.$$

Accordingly, the control vectors $b_1$ and $b_2$ are determined as follows.

$$b_1 = (2k_0 q + k_1 w_{30}^{1u} a_0)/3 w_{31}^{1u}, \quad (27)$$

$$b_2 = (2k_1 q + k_0 w_{33}^{1u} a_3)/\ w_{32}^{1u}.$$

A general method of joining two rational Bezier curves with continuity which uses the basis patch method is disclosed in the above-mentioned publications.

Figure 10:
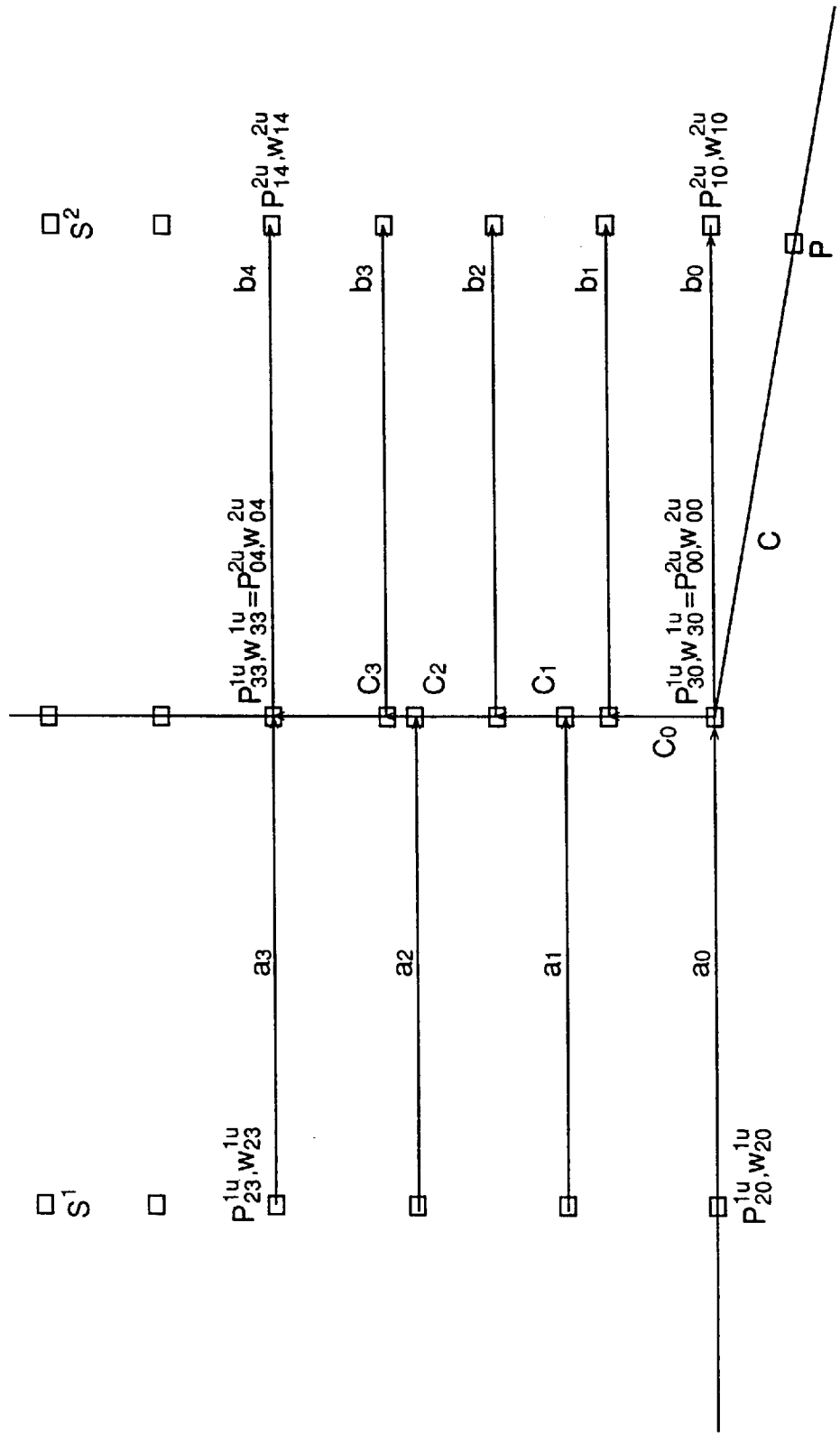
FIG. 10 is a diagram showing a connection of the NURBS boundary Gregory patch and a NURBS surface.

B. Generating Continuity Condition When NBG Patch and Fixed NURBS Surface Are Joined FIG. 10 shows a method of joining a NBG patch $S^2$ and a fixed NURBS surface $S^1$ with $G^1$ continuity. In the case of FIG. 10, the control points P[1u/ij] and the weights w[1u/ij] (i=2,3; j=0, . . . ,3) and the control points P[2u/ij] (i=0,1; j 0, . . . ,4) related to the subdivided curve segments of the boundary curve are applied to the above Equation (21). The degree of the fixed NURBS surface is assumed to be 3. The CBD functions of the U surface do not depend on the tangent vectors on a boundary curve CO continuous to the end point of the common boundary of the two surfaces $S_1$ and $S_2$. Therefore, when the common boundary curve is an irregular one, the scaler function h(v) of the Equation (21) can be set to h(v)=0, and the compatibility of the continuity condition is kept if this assumption is done. Accordingly, the Equation (21) can be rewritten to the following equation.

$$\sum_{i=0}^{4} \sum_{j=0}^{4} B_i^4(v) B_j^4(v) w_{1i}^{2u} w_{0j}^{2u} (P_{1i}^{2u} - P_{0j}^{2u}) = k(v) - \quad (28)$$

$$\sum_{i=0}^{3} \sum_{j=0}^{3} B_i^3(v) B_j^3(v) w_{3i}^{1u} w_{2j}^{1u} (P_{3i}^{1u} - P_{2j}^{1u})$$

wherein $B_i(v)$ and $B_j(v)$ are Bernstein polynomials which are represented by the above Equation (26).

The degree of the right and left terms of the above Equation (28) will now be taken into consideration. As the surface $S_1$ is cubic, the degree of the $\partial S^1/\partial u$ term is 6. Suppose that the scaler function k(v) of the Equation (28) is a linear function like $k(v)=k_0(1-v)+k_1 v$. Then, the degree of the left term of the Equation (28) is 7.

Generally, it is true that the degree of a derivative obtained from the representation of a rational Bezier function of degree n is 2n. Therefore, the degree of the left term of the Equation (28) must be even. By raising the degree of the $\partial S^1/\partial u$ term to 7, the degree of the right term of the Equation (28) can be made to degree 8. A free-form surface of degree 4 can be generated by joining the two surfaces with $G^1$ continuity.

Accordingly, the above Equation (28) is rewritten to the following equation.

$$\sum_{i=0}^{8} B_i^8(v) Q_i^{2u} = k(v) \sum_{i=0}^{7} B_i^7(v) Q_i^{1u} \tag{29}$$

wherein Q[1u] and Q[2u] are polynomials which are defined by

P[1u/ij], w[1u/ij] (i=2,3; j=0, . . . ,3); and P[2u/ij], w[2u/ij] (i=0,1; j=0, . . . , 4).

The above Equation (29) includes twelve unknowns, namely, $k_0$, $k_1$, w[2u/10], w[2u/11], w[2u/12], w[2u/13], w[2u/14], P[2u/10], P[2u/11], P[2u/12], P[2u/13], and P[2u/14].

First, a method of generating the vectors $b_0$ and $b_4$ on boundary curves continuous to end points P[1u/30] and P[1u/33] of the common boundary curve will be explained. It is necessary that these vectors lie on tangent planes at the end points P[1u/30] and P[1u/33] of the common boundary curve, and that they are collinear with control vectors $a_0$ and $a_3$ on the boundary curves continuous to the end points P[1u/30] and P[1u/33]. Under the above conditions, the vectors $b_0$ and $b_4$ satisfy the Equation (29).

Accordingly, the vector $b_0$ is generated to have the same magnitude as a vector $P-P[2u/00]$ on a boundary curve $C_0$ and the same direction as the vector $a_0$. Also, the vector $b_4$ lies on the joint of the common boundary curve, and it can be generated so as to have an arbitrary magnitude and direction if the abovementioned conditions are satisfied.

The weights w[1u/20], w[1u/23], w[2u/10] and w[2u/23] at the above-mentioned control points are determined so that they satisfy the constraining conditions w[2u/10]=w[1u/20]=w[2u/14] w[1u/23].

The unknowns $k_0$ and $k_1$ can easily be generated so as to satisfy the above conditions of the end points of the common boundary curve as follows.

$$w_{10}^{2u} w_{00}^{uu} b_0 = k_0 w_{30}^{1u} w_{20}^{1u} a_0,$$

$$w_{14}^{2u} w_{04}^{uu} b_4 = k_1 w_{34}^{1u} w_{24}^{1u} a_3.$$

The method of generating the values of the other unknowns of the above Equation (29) is complicated. A description thereof will be omitted, and only the results of the values of the other unknowns are listed in the following.

$$w_{11}^{2u} = \frac{w_{10}^{2} w_{41}^{1u}}{w_{40}^{1u}} - k_0 \left( w_{31}^{1u} + \frac{w_{41}^{1u} w_{31}^{1u}}{w_{40}^{1u}} \right) - \tag{30}$$

$$\frac{1}{4} w_{10}^{2u} \frac{1}{4} k_1 \left( w_{30}^{1u} + \frac{w_{40}^{1u} W_{34}^{1u}}{w_{44}^{1u}} \right) + \frac{1}{4} \frac{w_{40}^{1u} w_{14}^{2u}}{w_{44}^{1u}},$$

$$w_{12}^{2u} = \frac{-2}{3} \frac{w_{10}^{2u} w_{41}^{1u}}{w_{40}^{1u}} + \tag{31}$$

$$k_0 \left( \frac{w_{42}^{1u} w_{30}^{1u}}{w_{40}^{1u}} - w_{32}^{1u} + \frac{2}{3} w_{31}^{1u} + \frac{-2}{3} \frac{w_{41}^{1u} w_{30}^{1u}}{w_{40}^{1u}} \right) +$$

$$k_1 \left( \frac{-2}{3} w_{31}^{1u} + \frac{1}{6} w_{30}^{1u} - \frac{1}{6} \frac{w_{40}^{1u} w_{34}^{1u}}{w_{44}^{1u}} + \frac{2}{3} \frac{w_{41}^{1u} w_{34}^{1u}}{w_{44}^{1u}} \right) +$$

$$\frac{w_{10}^{2u} w_{42}^{1u}}{w_{40}^{1u}} + \frac{1}{6} w_{10}^{2u} - \frac{1}{6} \frac{w_{40}^{1u} w_{14}^{2u}}{w_{44}^{1u}} + \frac{2}{3} \frac{w_{41}^{1u} w_{14}^{2u}}{w_{44}^{1u}},$$

$$w_{13}^{2u} = \frac{1}{4} \frac{w_{44}^{1u} w_{10}^{2u}}{w_{40}^{1u}} + \frac{k_0}{4} \left( \frac{w_{44}^{1u} w_{30}^{1u}}{w_{40}^{1u}} - w_{34}^{1u} \right) + \tag{32}$$

$$k_1 \left( \frac{w_{43}^{1u} w_{34}^{1u}}{w_{44}^{1u}} - w_{33}^{1u} \right) + \frac{w_{14}^{2u} w_{43}^{1u}}{w_{44}^{1u}} - \frac{1}{4} w_{14}^{2u},$$

$$w_{11}^{2u} b_1 = k_0 \left( \frac{-1}{4} w_{30}^{1u} a_0 + w_{31}^{1u} a_1 \right) + \tag{33}$$

$$k_1 \left( \frac{1}{4} w_{30}^{1u} a_0 + \frac{1}{4} w_{30}^{1u} c_0 - \frac{1}{4} \frac{w_{40}^{1u} w_{34}^{1u} c_0}{w_{44}^{1u}} \right) + \frac{1}{4} w_{10}^{2u} c_0 -$$

$$\frac{1}{4} \frac{w_{40}^{1u} w_{14}^{2u} c_0}{w_{44}^{1u}},$$

$$w_{12}^{2u} b_2 = \tag{34}$$

$$k_0 \left( \frac{1}{6} w_{30}^{1u} a_0 - \frac{2}{3} w_{31}^{1u} a_1 + w_{32}^{1u} a_2 - \frac{2}{3} w_{31}^{1u} c_1 + \frac{2}{3} \frac{w_{41}^{1u} w_{30}^{1u} c_1}{w_{40}^{1u}} \right) +$$

$$k_1 \left( \frac{-1}{6} w_{30}^{1u} a_0 + \frac{2}{3} w_{31}^{1u} a_1 - \frac{1}{6} w_{30}^{1u} c_0 + \frac{1}{6} \frac{w_{40}^{1u} w_{34}^{1u} c_0}{w_{44}^{1u}} + \frac{2}{3} w_{31}^{1u} c_1 - \right.$$

$$\frac{1}{6} w_{30}^{1u} c_1 + \frac{1}{6} \frac{w_{40}^{1u} w_{34}^{1u} c_1}{w_{44}^{1u}} - \frac{2}{3} \frac{w_{41}^{1u} w_{34}^{1u} c_1}{w_{44}^{1u}} \right) - \frac{1}{6} w_{10}^{2u} c_0 +$$

$$\frac{1}{6} \frac{w_{40}^{1u} w_{14}^{2u} c_0}{w_{44}^{1u}} - \frac{2}{3} \frac{w_{41}^{1u} w_{10}^{2u} c_1}{w_{44}^{1u}} - \frac{1}{6} w_{11}^{2u} c_1 + \frac{1}{6} \frac{w_{40}^{1u} w_{14}^{2u} c_1}{w_{44}^{1u}} -$$

$$\frac{2}{3} \frac{w_{41}^{1u} w_{14}^{2u} c_1}{w_{44}^{1u}},$$

$$w_{13}^{2u} b_3 = \frac{k_0}{4} \left( w_{34}^{1u} a_4 + \frac{w_{44}^{1u} w_{30}^{1u} c_3}{w_{40}^{1u}} - w_{34}^{1u} c_3 \right) + \tag{35}$$

$$k_1 \left( w_{33}^{1u} a_3 - \frac{1}{4} w_{34}^{1u} a_4 \right) + \frac{1}{4} \frac{w_{44}^{1u} w_{10}^{2u} c_3}{w_{40}^{1u}} - \frac{1}{4} w_{14}^{2u} c_3.$$

(3) Interpolation of Curve Mesh with NBG Patch

Next, a description will be given of a method of interpolating a curve mesh by generating an NBG patch according to the present invention based on the continuity condition which has been generated in the previous section (2).

Figure 11:
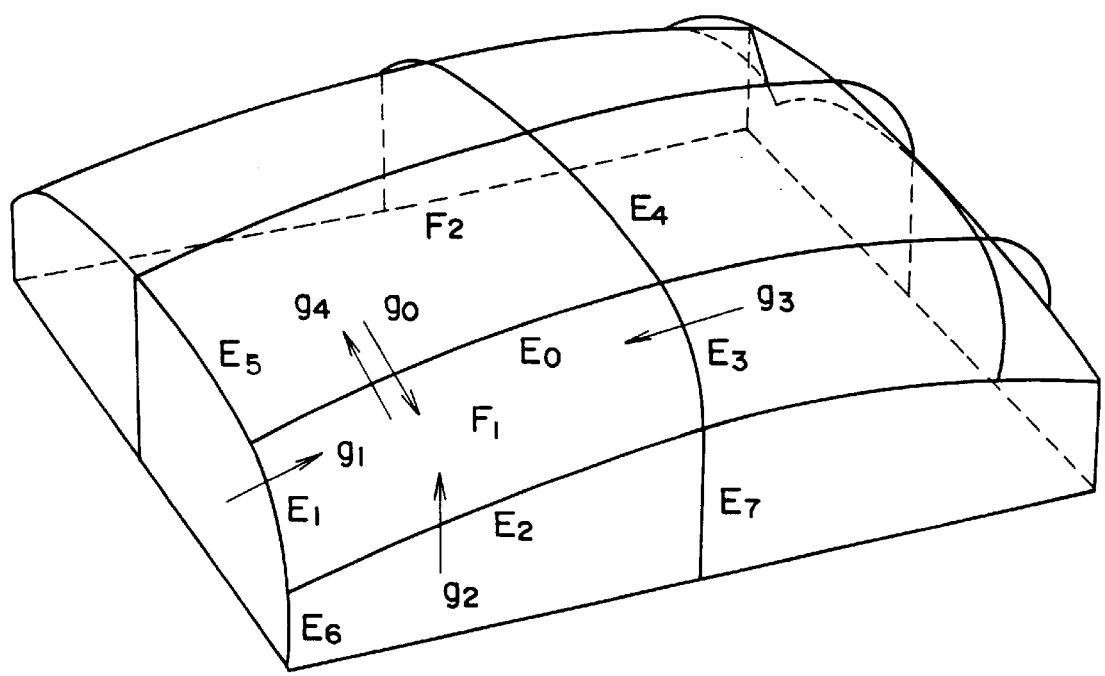
FIG. 11 is a diagram for explaining the surface interpolation using the NURBS boundary Gregory patch of the present invention.

FIG. 11 shows the interpolation method of a curve mesh with the NBG patch. In FIG. 11, a simple curve mesh is illustrated. A surface $F_1$ is defined by four NURBS curves $E_i$ (i=0, . . . ,3). By referring to FIG. 11, a method of interpolating this surface $F_1$ with an NBG patch according to the present invention will be explained in the following:

A. Definition of CBD Functions

A first step of the interpolation method is to define CBD (cross boundary derivative) functions of the respective edge curves of the surface $F_1$ (the curve mesh). A CBD function $g_0(t)$ is represented by using NURBS curves, and it is defined by edge curves $E_1$ and $E_3$ and vectors on an edge curve $E_0$. A description of these vectors will be given in the following section (4).

When tangent vectors at end points of the edge curve $C_0$ and tangent vectors of end points of edge curves $E_1$, $E_5$, $E_3$ and $E_4$ continuous to the end points of the edge curve $E_0$ satisfy the above Equation (20), the CBD function $g_0(t)$ is defined by these edge curves. This means that when two surfaces $F_1$ and $F_2$ join with tangent continuity on the boundary curve $E_0$, the two CBD functions $g_0(t)$ and $g_4(t)$ have the relationship: $g_0(t)=-g_4(t)$. The other CBD functions $g_i(t)$ (i=1,2,3) can be defined in the same manner.

B. Determination of Internal Control Points

If all the CBD functions of the boundary curves of the surface $F_1$ are defined, internal control points of the surface $F_1$ are determined in accordance with the continuity condition which has been generated in the previous section (2). On this phase, U and V surfaces of the NBG patch can be determined based on the internal control points.

C. Determination of Control Points of C Surface

If the control points of the U and V surfaces is determined, control points of a C surface of the NBG patch are determined by applying the data of the determined control points to the above Equations (16) and (19).

(4) Shape Design By Using NBG Patch

Next, a description will be given of a shape modification method which uses the NBG patch of the present invention. In the following, a method of determining vectors used in the continuity condition described in the previous section (2), and a method of controlling the shape of a surface by using the vectors will be explained. Furthermore, a method of generating a fillet surface by using an NBG patch, and a method of joining an NBG patch and a fixed NURBS surface with tangent continuity will be explained.

(4-1) Modification of Surface Shape

A. Control Points of Surface

As described in the previous section (1), an NBG patch obtained from the interpolation of a curve mesh with a boundary curve defined by a NURBS curve is expressed by blending three surfaces: the U, V and C surfaces. Generally, designers intend to modify the shape of a generated surface by changing the locations of control points of a boundary curve and re-interpolating the surface with the moved control points. This operation results in a shape modification of the NURBS curve, and it is conceivable to the designers. However, it is very difficult for the designers to modify the shape of a surface by moving control points of the surface while taking into account the continuity condition for adjacent surfaces. As the relation between the surface shape and the control points is uncertain to the designers, it is also uncertain what a distance and direction in which the control points should be moved in order to generate a desired shape.

Figure 12:
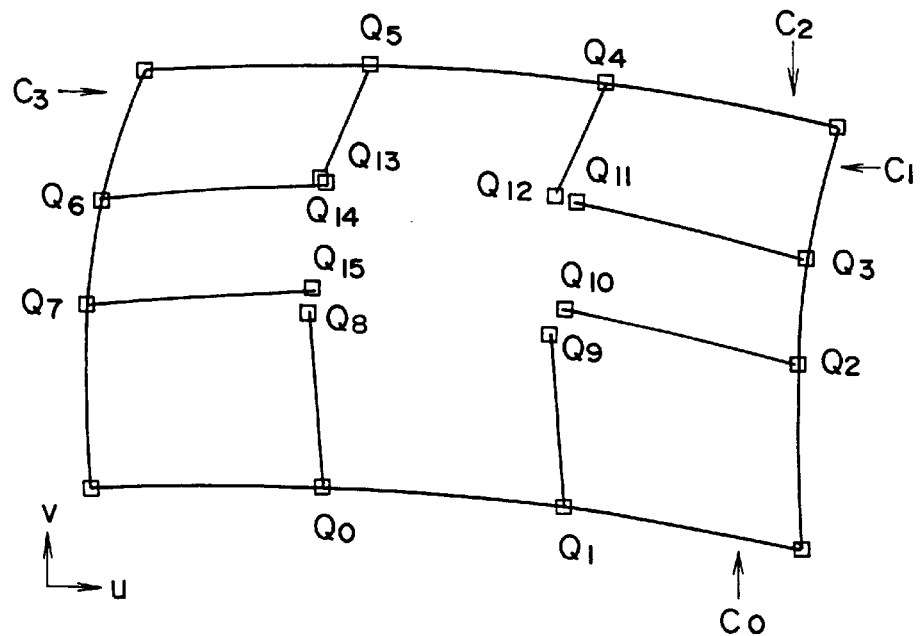
FIG. 12 is a diagram showing control points of the NURBS boundary Gregory patch of the present invention.

FIG. 12 shows control points of an NBG patch of the present invention. In FIG. 12, a curve mesh including four boundary curves each of which consists of three curve segments is shown. Control points $Q_i$ (i=0, . . . , 7) correspond to joints of the boundary curves, and $Q_i$ (i=8, . . . ,15) correspond to respective end points of vectors with a magnitude that is equal to one third of each magnitude of CBD derivatives of the joints. For example, the control point $Q_0$ is a joint of a boundary curve $C_0$ for a parameter $u=u_0$, and a vector $Q_0Q_8$ is a vector with a magnitude that is equal to one third of a magnitude of a CBD derivative of the point $Q_0$. By using the control points shown in FIG. 12, all the CBD derivatives of the joints of the boundary curves can be visualized.

For the sake of explanation, four control points $Q_{06I}$, $Q_8$, $Q_{13}$ and $Q_5$ lying at joints of two opposing boundary curves $C_0$ and $C_2$, shown in FIG. 12, will be considered. A Bezier curve including these four control points will be called a guide curve. When a generated surface is twisted, the shape of the guide curve of that surface accurately corresponds to the twisted shape. The designers can modify the shape of the surface to a desired shape by moving the control points of the guide curve. The relationship between the surface shape and the control points is clarified by using the guide curves, and the designers can easily modify the shape of the surface.

B. Local Shape Modification By Guide Curve

Next, a description will be given of a method of local shape modification using the above-mentioned guide curve.

FIG. 13 shows parametric lines of a NURBS surface. As shown in FIG. 13, the shape of the NURBS surface is distorted.

FIG. 14 shows control points and guide curves obtained from derivative vectors lying on joints of the NURBS surface. As shown in FIG. 14, the guide curves are twisted. In the case of FIG. 14, boundary curves $C_0$ and $C_2$ each of which includes nine joints, and the parameter values of the respective joints are different from each other. In order to evaluate the shape of the surface with the guide curves, knots are inserted so that 18 guide curves having joints with the shared parameter values are generated.

In order to modify the shape of a surface to a desired shape, it is necessary to define appropriate vectors lying on the joints of the boundary curves. A general method of the local shape modification which is performed in the following two steps (1) and (2) will be explained.

(1) Setting of Control Vectors

Figure 15:
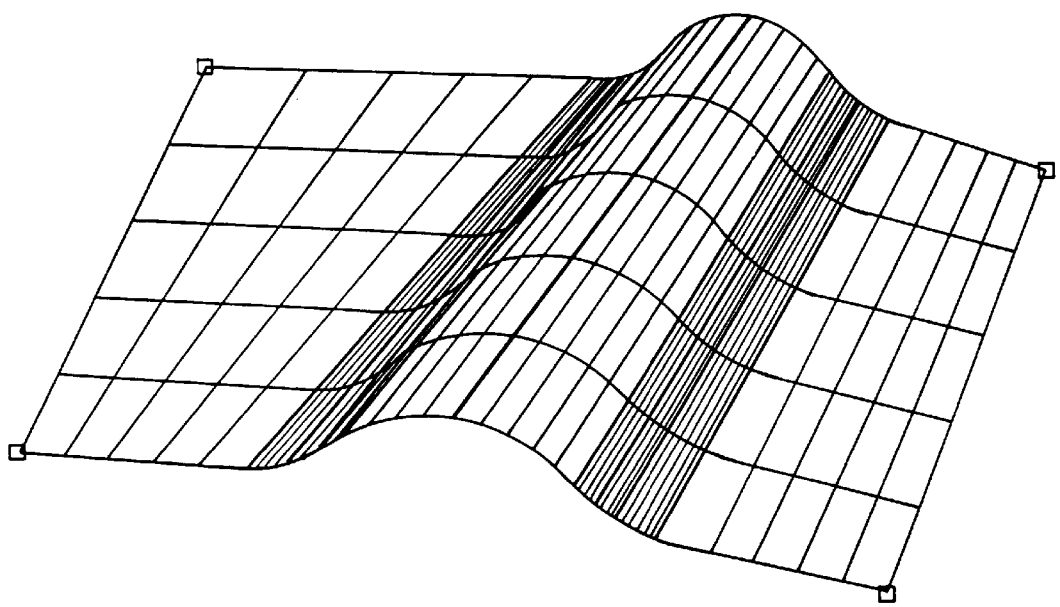
FIG. 15 is a diagram showing parametric lines of Gregory patches.
Figure 16:
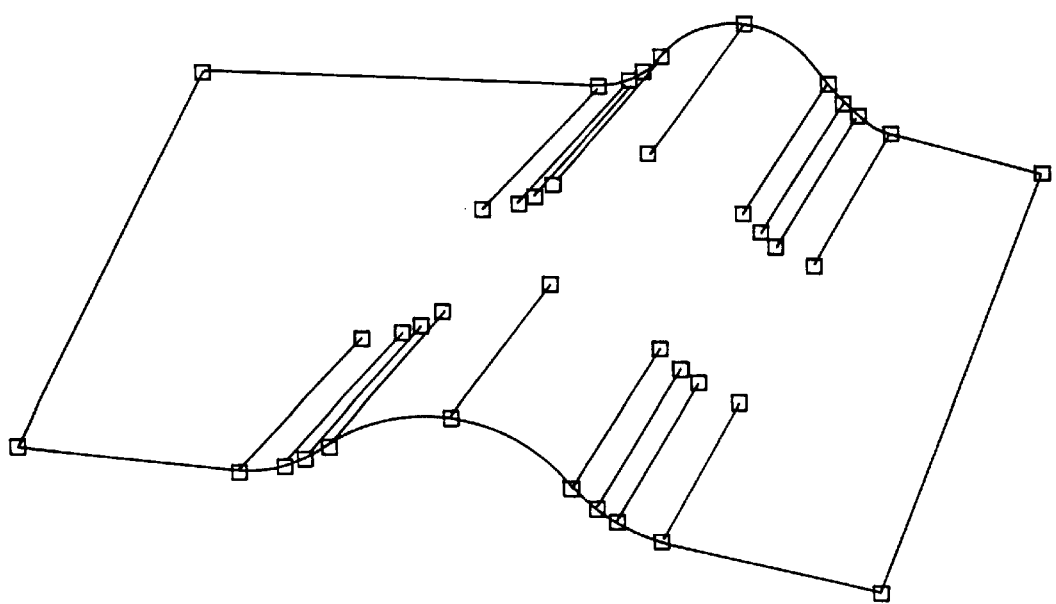
FIG. 16 is a diagram showing derivative vectors and control points of the parametric lines of the Gregory patches.

FIG. 15 shows parametric lines of Gregory patches. A plurality of guide curves which intersect the surfaces, indicated by thick lines in FIG. 15, are supposed. A plurality of derivative vectors lying at end points of these guide curves are defined as being a plurality of control vectors on the boundaries of the surfaces, and the end points of the curves correspond to respective joints of the vectors. FIG. 16 shows derivative vectors and control points of the guide curves of the surfaces. Each of the derivative vectors in FIG. 16 has an internal control point at its end opposite to the end point of that guide curve.

(2) Setting of Knots

Figure 17:
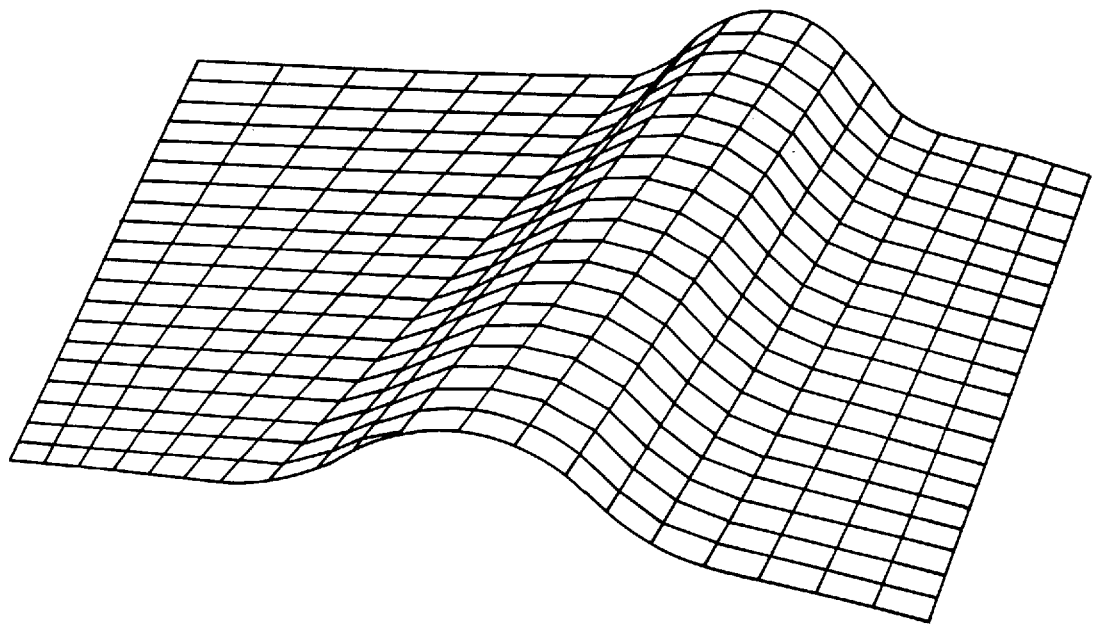
FIG. 17 is a diagram showing corrected parametric lines of a NURBS boundary Gregory patch according to the present invention.

A plurality of knots are inserted so that the respective two opposing curves have joints with the shared parameter values are generated. For this purpose, the average of the parameter values of the joints of the two opposing curves is used. Accordingly, the shape of the surface is modified by using the derivative vectors. FIG. 17 shows corrected parametric lines of the NBG patch according to the present invention. The distortion of the shape can be eliminated by using the NBG patch according to the present invention.

Figure 18:
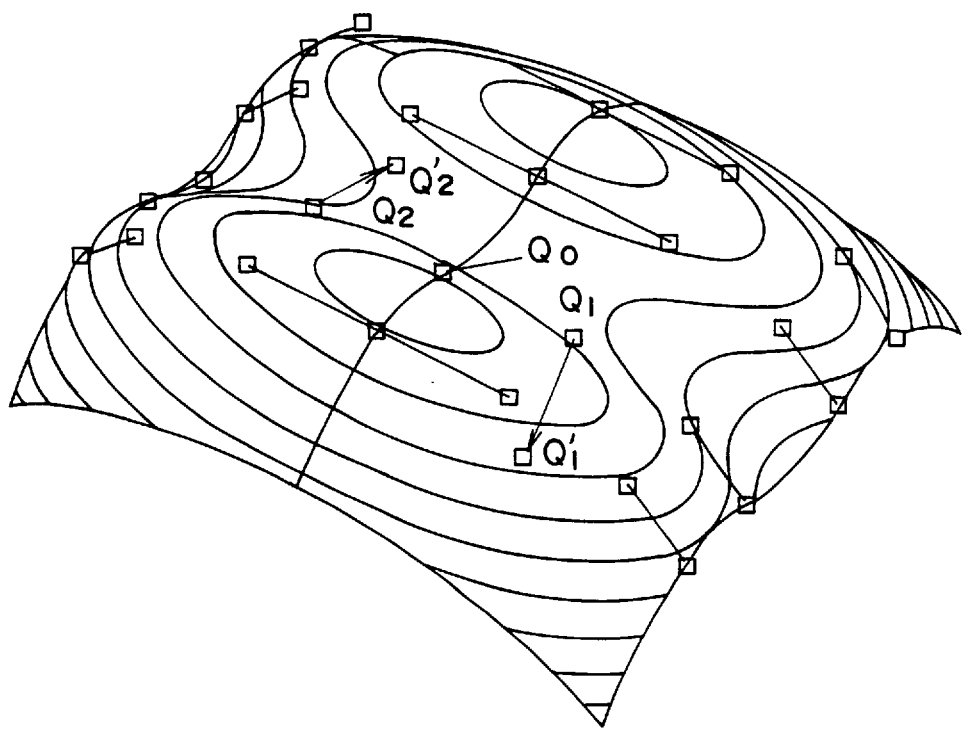
FIG. 18 is a diagram showing control points and cross-sectional curves of two NURBS boundary Gregory patches before a shape modification is performed.

FIG. 18 shows control points and parametric lines of two NURBS boundary Gregory patches which are joined with $G^1$ continuity on a common boundary thereof. A method of local shape modification in which a surface shape is modified by moving a control point of the surface indicated by $Q_1$ in FIG. 18 to a location indicated by $Q_1'$ in FIG. 18 will be explained.

It is necessary that the continuity between surfaces is unchanged after the local shape modification is performed. A vector $Q_0Q_1$ between two control points and a derivative vector at the control point $Q_0$ of the boundary curve represents a tangent plane at $Q_0$. As the control point $Q_1$ is moved, this tangent plane is changed to a new tangent plane. Therefore, it is necessary to project a control point $Q_2$ onto the new tangent plane after the control point $Q_1$ is moved. In this embodiment, the control point $Q_2$ is moved to a location indicated by $Q_2'$ after the control point $Q_1$ is moved, while the magnitude of a vector between the control points $Q_0$ and $Q_2$ is maintained.

Figure 19:
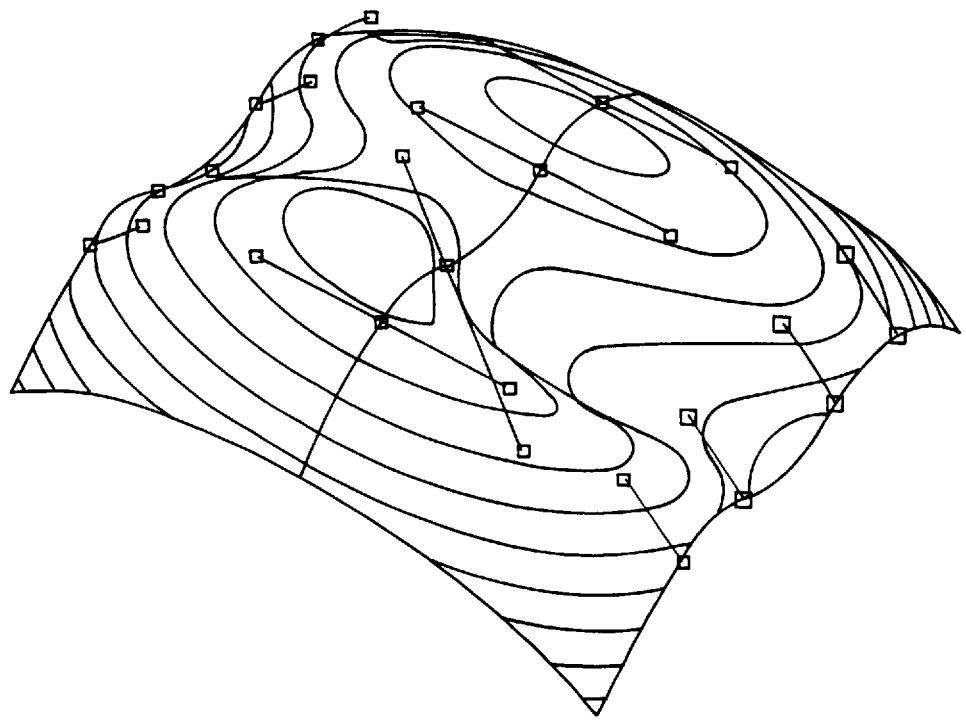
FIG. 19 is a diagram showing control points and cross-sectional curves of the NURBS boundary Gregory patches after the shape modification is performed.

FIG. 19 shows control points and cross-sectional curves of the surfaces after the local shape modification is performed. It is possible to modify the shape of the surfaces with the continuity unchanged in this embodiment.

C. Modification By Moving Arbitrary Point on Surface

In the local shape modification of the above-described embodiment, the shape modification is performed by taking into consideration the cross boundary derivatives (CBD) of the boundaries of the surface. However, when the NBG patch of the present invention is used, the shape modification in which only the CBD is taken into consideration is insufficient. In the following, a method of controlling an internal shape of a surface by moving an arbitrarily specified point on the surface will be explained.

Figure 20:
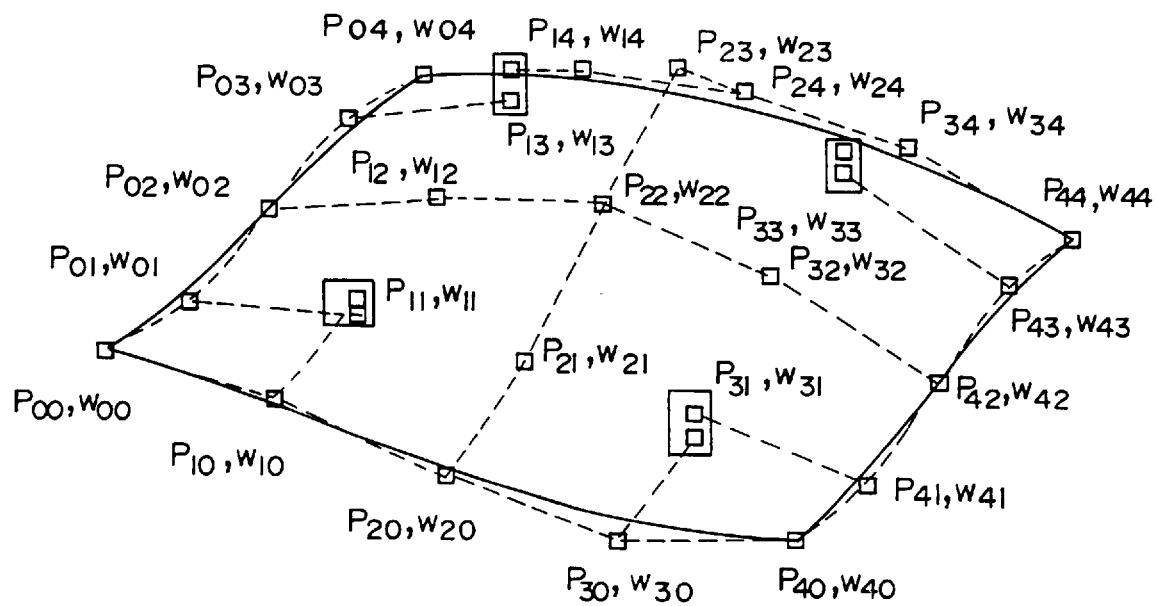
FIG. 20 is a diagram showing control points of a C surface of a NURBS boundary Gregory patch.

FIG. 20 shows control points of a C surface of a NURBS boundary Gregory (NBG) patch of the present invention, the degree of which is raised to 4. In FIG. 20, The surface defined by the NBG patch includes a control point $P_{22}$ which is not needed to join the surface to adjacent surfaces. In accordance with the above Equation (1), a relationship between the C surface S[c] and a point $S(u_0, v_0)$ on the C surface when the parameters are set to $u=u_0$ and $v=v_0$ is represented as follows.

$$S^c(u_0,v_0)=S^u(u_0,v_0)+S^v(u_0,v_0)-S(u_0,v_0) \quad (36)$$

As $S(u_0,v_0)$, $S[u](u_0,v_0)$ and $S[v](u_0,v_0)$ in the above Equation (36) are predetermined, the right term of the Equation (36) is considered as being constant (=K). When the parameters are set to $u=u_0$ and $v=v_0$, the C surface S[c] is represented as follows.

$$S^c(u_0, v_0) = \frac{\sum_{i=0}^{4} \sum_{j=0}^{4} B_i^4(u_0)B_j^4(v_0)w_{ij}P_{ij}}{\sum_{i=0}^{4} \sum_{j=0}^{4} B_i^4(u_0)B_j^4(v_0)w_{ij}}$$

Of the control points in FIG. 20, control points $P_{ij}$ (ij=11, 13, 31, 33), indicated by rectangular boxes in FIG. 20, and control points $P_{ij}$ (i, j=0, 1, 3, 4), indicated on the boundaries in FIG. 20, can be generated by substituting the parameter values of a specified point into the Equations (8) through (15). As all the control points which represent the boundaries and the cross boundary derivative functions are already known, the unknowns in the above equation are the internal control point $P_{22}$ and its weight $w_{22}$ only. If the weight is assumed to be $w_{22}=1$, the internal control point $P_{22}$ can be generated in accordance with the following equation.

$$P_{22} = \frac{K - \sum_{I=0}^{4}\sum_{J=0}^{4} B_I^4(u_0)B_J^4(v_0)w_{IJ} - \sum_{i=0}^{4}\sum_{j=0}^{4} B_i^4(u_0)B_j^4(v_0)W_{ij}P_{ij}}{B_2^4(u_0)B_2^4(v_0)w_{22}} \quad (37)$$

$(ij \neq 22)$

Accordingly, the designers can modify the internal shape of the surface to a desired shape by arbitrarily specifying a parametric point on the surface and moving the specified point to an appropriate location.

Figure 21:
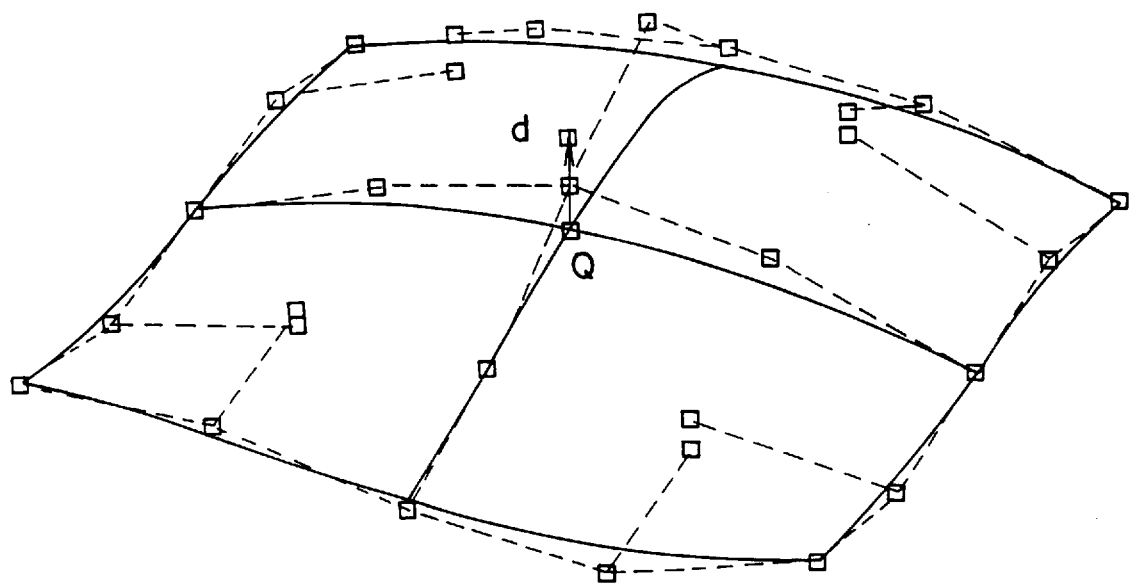
FIG. 21 is a diagram showing control points and guide curves of the surface, and a specified parametric point on the surface.
Figure 22:
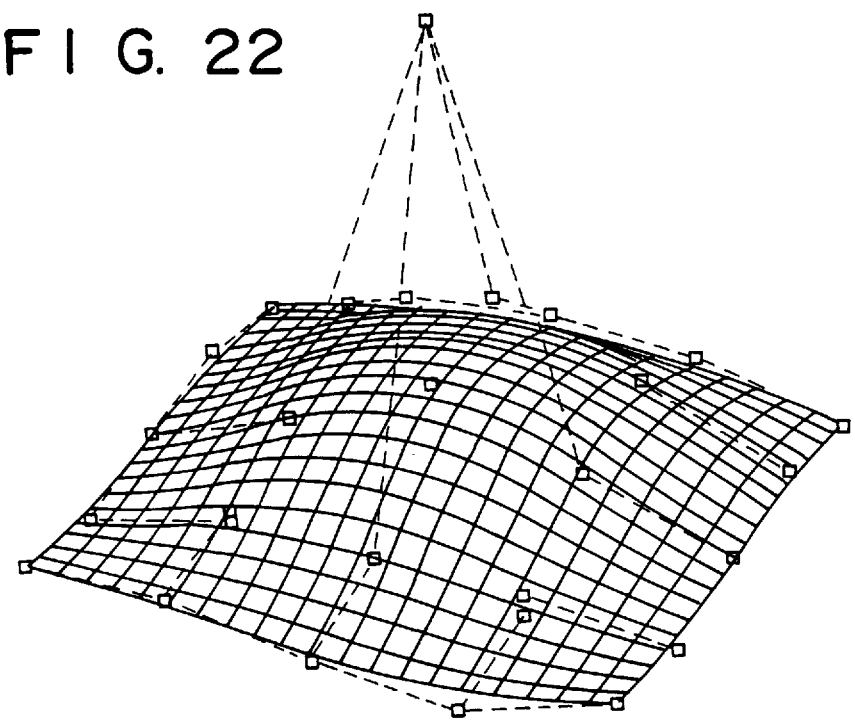
FIG. 22 is a diagram showing control points and guide curves of the surface after the shape modification is performed.

FIG. 21 shows control points of an NBG patch, parametric lines when the parameters u=0.5 and v=0.5, and a specified point Q. The point Q is moved by a distance and direction indicated by a vector d. A new point after the movement is generated by obtaining a sum (Q+d). Thus, based on the above Equations (36) and (37), control points of the C surface after the shape modification can be generated. FIG. 22 shows control points and parametric lines of the surface after the shape modification is performed.

(4-2) Application to Fillet Surface

There is a conventional method of generating a fillet surface by using Gregory patches. The conventional method may produce a complex topology when the original surface is a free-form surface. There is a problem that the quantity of data to be processed is increased and the operability is lowered if a complex topology is produced.

To eliminate the above problem, the NBG patch of the present invention can suitably be applied to a method of generating a fillet surface.

Figure 23:
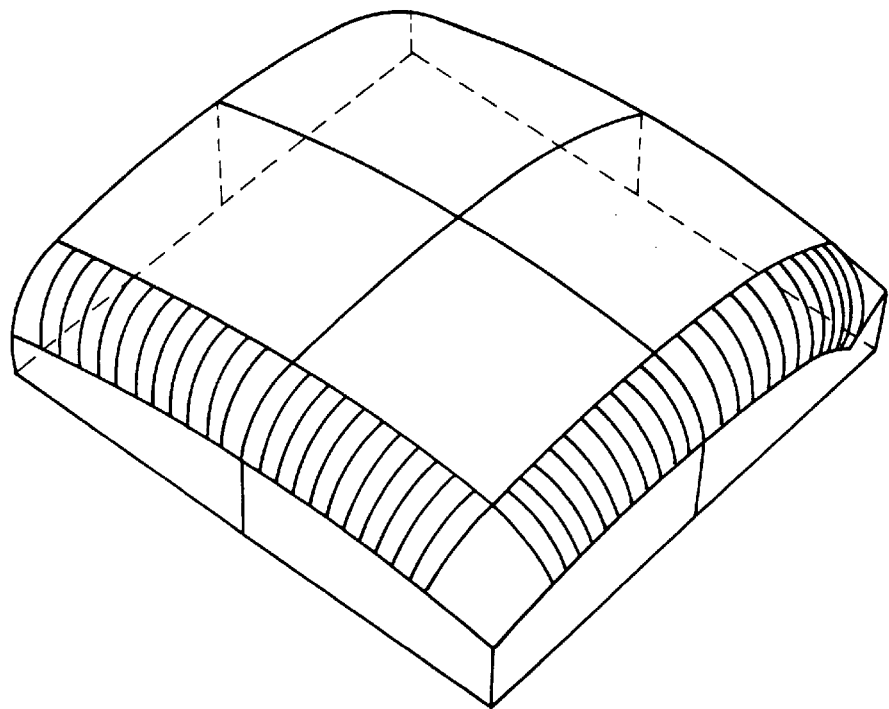
FIG. 23 is a representation of fillet surfaces generated by using Gregory patches.

FIG. 23 shows fillet surfaces which are generated by using Gregory patches. A method of representing such fillet surfaces with a simple topology, which uses the NBG patches of the present invention, will be explained.

Internal edge curves included in thick lines shown in FIG. 23 are inserted in order to join adjacent surfaces of the fillet surface with tangent continuity by using the Gregory patch. If the continuity condition for the adjacent surfaces is satisfied, the internal edge curves in FIG. 23 can be omitted.

Figure 24:
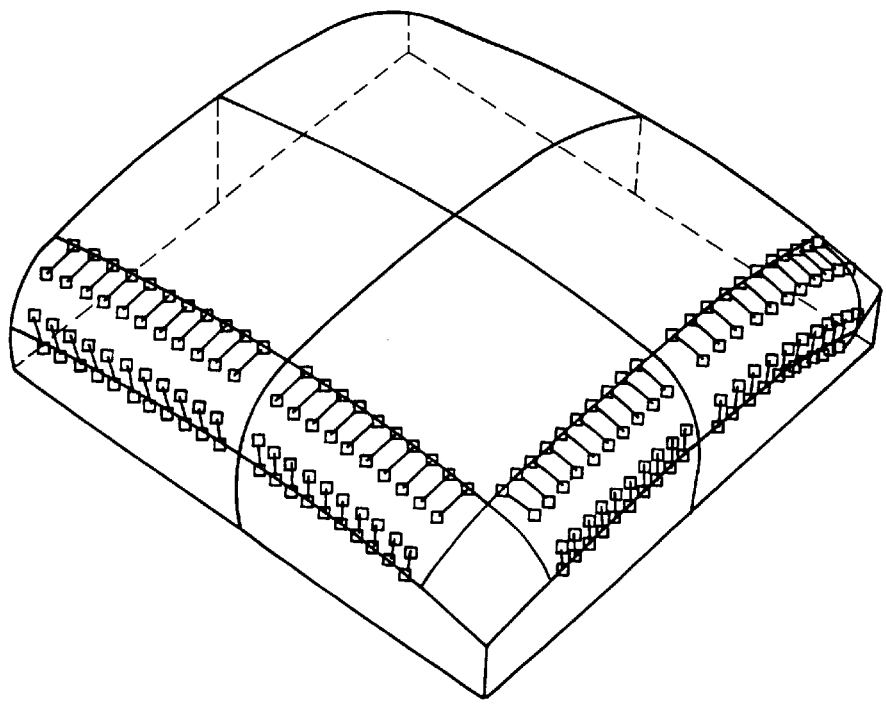
FIG. 24 is a representation of fillet surfaces generated by using NURBS boundary Gregory patches of the present invention.

FIG. 24 shows a fillet surface which is generated by using the NBG patches of the present invention. In FIG. 24, various vectors are added to boundary curves of the fillet surface, instead of inserting the internal edge curves in FIG. 23. The fillet surface is represented by generating the NBG patch based on the vectors. These vectors are, for example, tangent vectors corresponding to end points of the edge curves of FIG. 23 which are generated in accordance with a conventional method.

Figure 25:
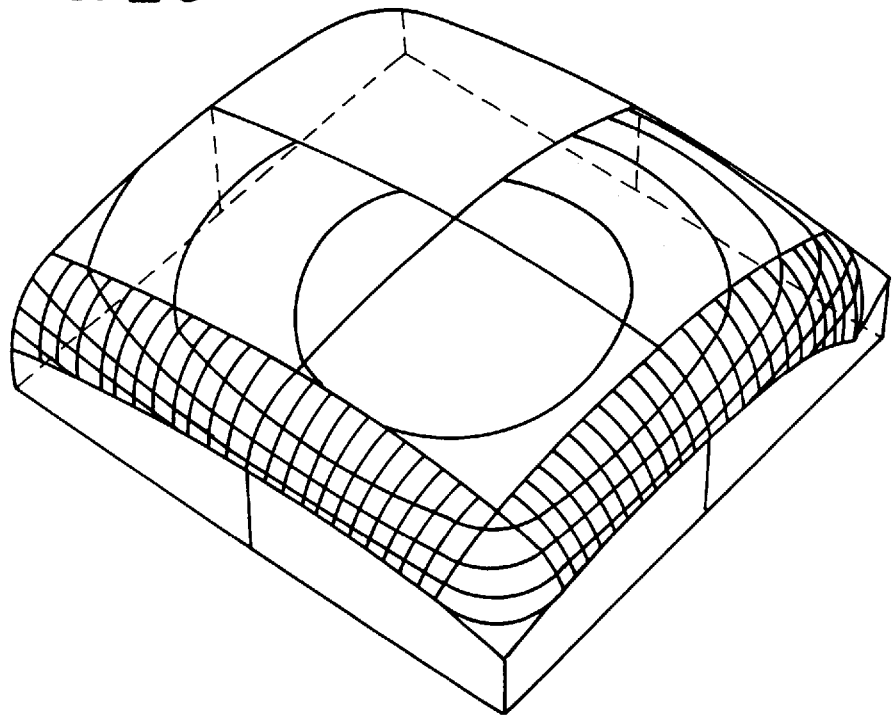
FIG. 25 is a diagram showing cross-sectional curves of the fillet surfaces in FIG. 23.
Figure 26:
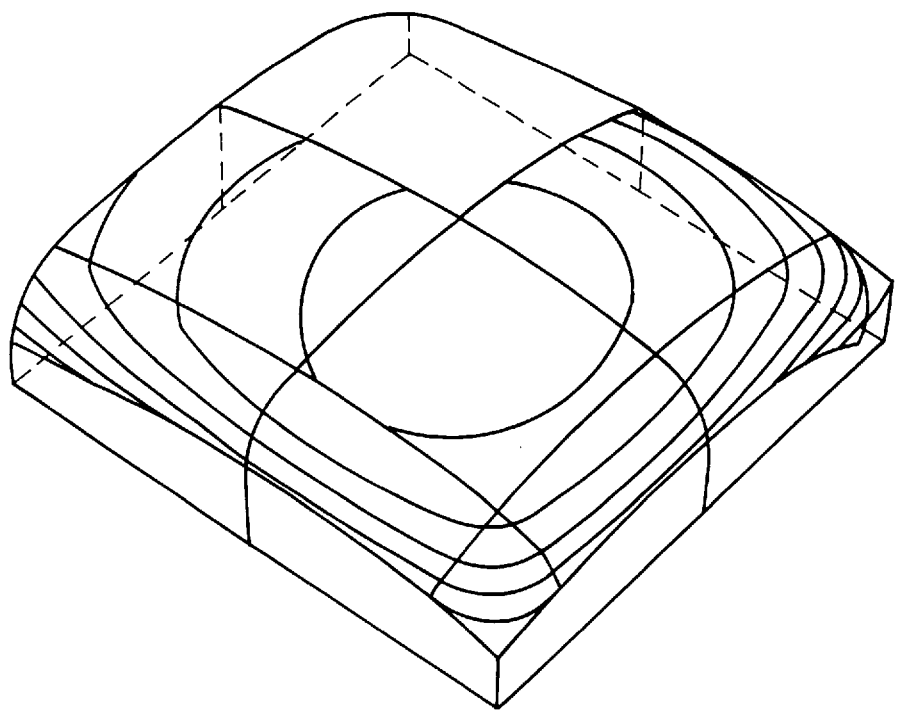
FIG. 26 is a diagram showing cross-sectional curves of the fillet surfaces in FIG. 24.

FIG. 25 shows cross-sectional curves of the fillet surfaces which are generated by using the Gregory patches. FIG. 26 shows cross-sectional curves of the fillet surfaces which are generated by using the NBG patches of the present invention. As shown in FIG. 26, the continuity condition for the adjacent surfaces is satisfied even when the fillet surfaces are generated by using the NBG patches of the present invention.

Figure 27:
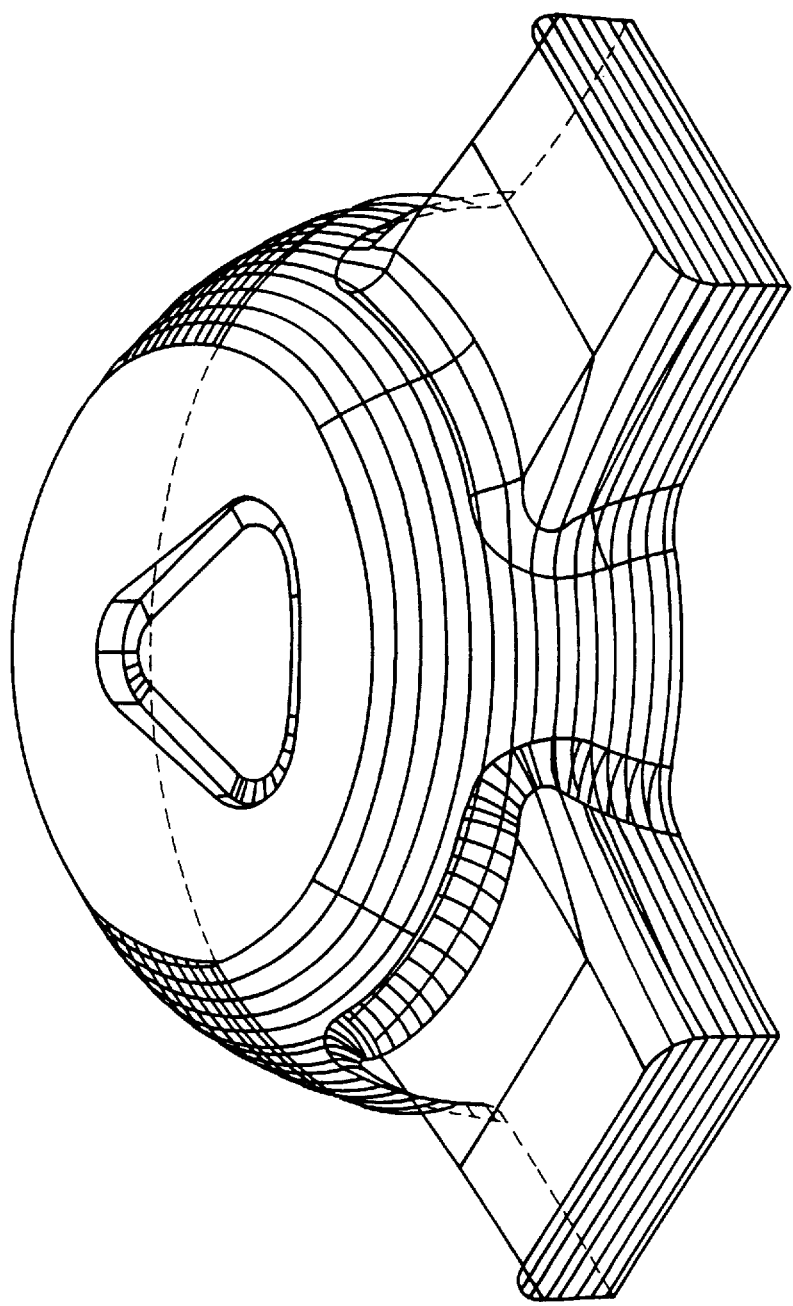
FIG. 27 is a diagram showing cross-sectional curves of a fillet surface generated for intersection between a free-form surface and an analysis surface.

FIG. 27 shows cross-sectional curves of a fillet surface which is generated for intersection between a free-form surface and a analysis surface. Shown in the left half of this drawing are cross-sectional curves when the fillet surface is generated by a conventional method. Also, shown in the right half of this drawing are cross-sectional curves when the fillet surface is generated by setting tangent vectors of end points of internal edge curves within the fillet surface, generated by the conventional method to vectors, and using the NBG patch of the present invention. It is found that in a case in which a detailed shape of a fillet surface is not needed, the interpolation of the curve mesh using the NBG patch of the present invention is effective.

(4-3) Joining NBG Patch to Fixed NURBS Surface

Figure 28:
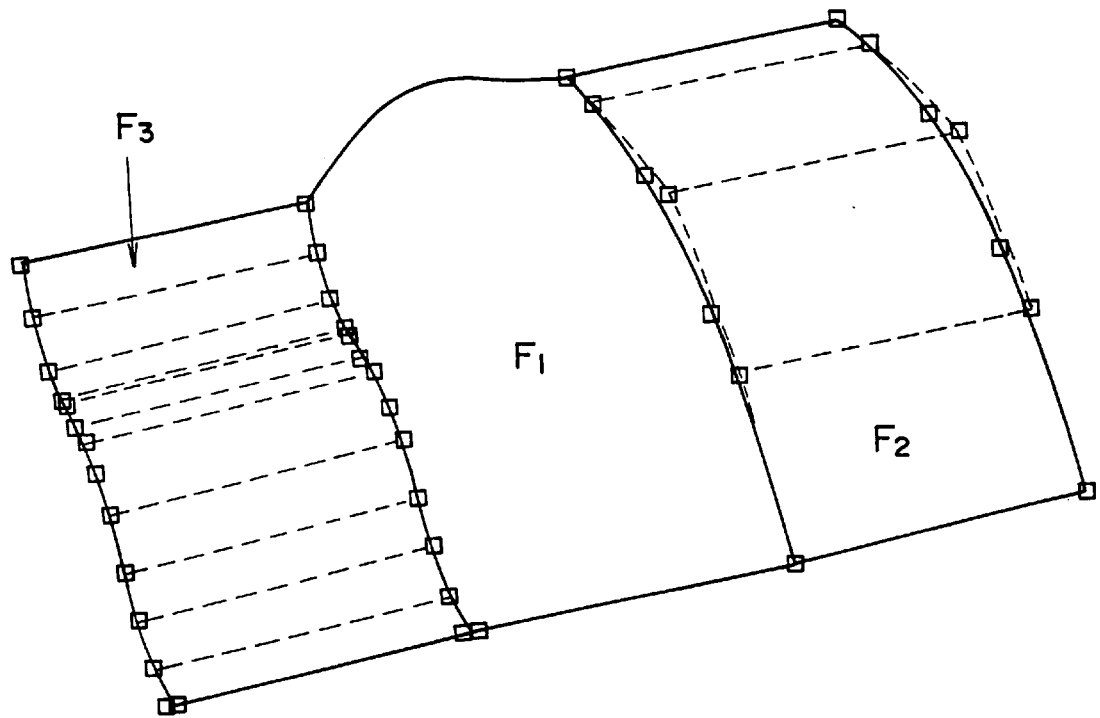
FIG. 28 is a diagram showing an irregular curve mesh including NURBS surfaces.

FIG. 28 shows an irregular curve mesh including NURBS surfaces. In FIG. 28, a surface $F_2$ is a B-spline surface and a surface $F_3$ is a NURBS surface with weights of control points which are different from weights of control points of the surface $F_2$.

Figure 29:
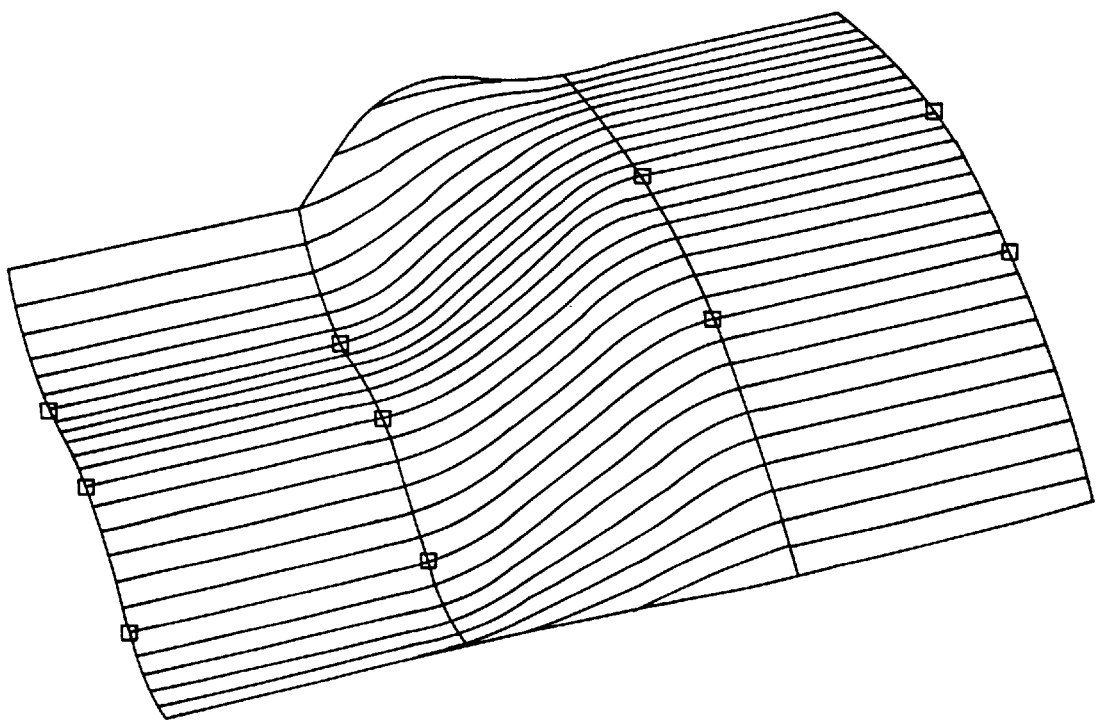
FIG. 29 is a diagram showing cross-sectional curves of the curve mesh in which the NURBS surfaces are interpolated with a NURBS boundary Gregory patch.

FIG. 29 shows cross-sectional curves of the curve mesh shown in FIG. 28 when the two surface $F_2$ and $F_3$ are interpolated by generating an NBG patch according to the present invention. As shown in FIG. 29, the two surface $F_2$ and $F_3$ are smoothly joined by the NBG patch.

Further, the present invention is not limited to the above described embodiments, and variations and modifications may be made without departing from the scope of the present invention.

We claim:

1. A method of generating two free-form surfaces which are joined with $G^1$ continuity on a common boundary defined by a NURBS common boundary curve, comprising steps of:

calculating tangent vectors at each of end points of the NURBS common boundary curve and tangent vectors on boundary curves connected to the end points of the NURBS common boundary curve;

detecting a continuity on the common boundary of the two free-form surfaces at each of the end points based on the tangent vectors at the end points of the NURBS common boundary curve and the tangent vectors on the boundary curves and storing results of the detection of the continuity on the common boundary at the end points;

deriving solutions to one of predetermined differential equations, required for joining the two free-form surfaces with $G^1$ continuity, from the results of the detection and storing derived solutions, said one of the predetermined differential equations being selected in accordance with the results of the detection of the continuity on the common boundary at the end points, a boundary condition with respect to said one of the predetermined differential equations being determined by the results of the detection and the tangent vectors at the end points of the NURBS common boundary curve and the tangent vectors on the boundary curves, the derived solutions including unknown variables used to calculate internal control points of each of the free-form surfaces; and generating the internal control points of each of the two free-form surfaces by obtaining the derived solutions including the unknown variables when the continuity at each of the end points of the NURBS common boundary curve is detected so that the two free-form surfaces which are joined with $G^1$ continuity on the common boundary are generated.

2. The method according to claim 1, wherein internal control points of all boundary curves of the two free-form surfaces are generated, said internal control points and all of the boundary curves being used to generate NURBS boundary Gregory patches, so that the two free-form surfaces joined with $G^1$ continuity on the common boundary are generated by using the NURBS boundary Gregory patches.

3. The method according to claim 2, wherein the two free-form surfaces to be joined with $G^1$ continuity on the common boundary are a NURBS boundary Gregory patch and a fixed NURBS surface, and wherein said deriving step derives solutions to predetermined differential equations required for joining the NURBS boundary Gregory patch and the fixed NURBS surface with $G^1$ continuity, the derived solutions including unknown variables used to calculate internal control points of each of the NURBS boundary Gregory patch and the fixed NURBS surface, and wherein said internal control point generating step generates the internal control points of each of the NURBS boundary Gregory patch and the fixed NURBS surface by obtaining the derived solutions including the unknown variables so that the NURBS boundary Gregory patch and the fixed NURBS surface joined with $G^1$ continuity on the common boundary are generated.

4. The method according to claim 2, wherein boundary curves of a fillet face between free-form surfaces are omitted and vectors are added to the fillet face instead of the boundary curves, said fillet face being interpolated by generating NURBS boundary Gregory patches based on the vectors.

5. The method according to claim 2, wherein a plurality of vectors on joints of boundary curves of a surface are defined so that a shape of the surface is modified by using said vectors.

6. A free-form surface generating apparatus comprising:
means for receiving curve mesh data which represents a curve mesh;

processing means for processing said curve mesh data to generate surface data;

memory means for storing said surface data; and reference means for retrieving said surface data from said memory means, wherein said processing means generates two free-form surfaces which are joined with $G^1$ continuity on a common boundary defined by a NURBS common boundary curve, and comprises:

means for calculating tangent vectors at each of end points of the NURBS common boundary curve and tangent vectors on boundary curves connected to the end points of the NURBS common boundary curve;

means for detecting a continuity on the common boundary of the two free-form surfaces at each of the end points based on the tangent vectors at the end points of the NURBS common boundary curves and storing results of the detection of the continuity on the common boundary at the end points;

means for deriving solutions to one of predetermined differential equations, required for joining the two free-form surfaces with $G^1$ continuity, from the results of the detection and storing derived solutions, said one of the predetermined differential equations being selected in accordance with the results of the detection of the continuity on the common boundary at the end points, a boundary condition with respect to said one of the predetermined differential equations being determined by the results of the detection and the tangent vectors at the end points of the NURBS common boundary curve and the tangent vectors on the boundary curves, the derived solutions including unknown variables used to calculate internal control points of each of the free-form surfaces; and means for generating the internal control points of each of the two free-form surfaces by obtaining the derived solutions including the unknown variables when the continuity at each of the end points of the NURBS common boundary curve is detected so that the two free-form surfaces which are joined with $G^1$ continuity on the common boundary are generated.

7. The apparatus according to claim 6, wherein said means for generating the internal control points generates internal control points of all boundary curves of the two free-form surfaces, said internal control points and all of the boundary curves being used to generate NURBS boundary Gregory patches so that the two free-form surfaces joined with $G^1$ continuity on the common boundary are generated by using the NURBS boundary Gregory patches.

8. The apparatus according to claim 7, wherein the two free-form surfaces to be joined with $G^1$ continuity on the common boundary are a NURBS boundary Gregory patch and a fixed NURBS surface, and wherein said deriving means derives solutions to predetermined differential equations required for joining the NURBS boundary Gregory patch and the fixed NURBS surface with $G^1$ continuity, the derived solutions including unknown variables used to calculate internal control points of each of the NURBS boundary Gregory patch and the fixed NURBS surface, and wherein said internal control point generating means generates the internal control points of each of the NURBS boundary Gregory patch and the fixed NURBS surface by obtaining the derived solutions including the unknown variables so that the NURBS boundary Gregory patch and the fixed NURBS surface joined with $G^1$ continuity on the common boundary are generated.

9. The apparatus according to claim 7, wherein boundary curves of a fillet between free-form surfaces are omitted and vectors are added to the fillet face instead of the boundary curves, said fillet face being interpolated by generating NURBS boundary Gregory patches based on the vectors.

10. The apparatus according to claim 7, wherein a plurality of vectors on joints of boundary curves of a surface are defined so that a shape of the surface is modified by using said vectors.

* * * * *